US011634640B2

(12) United States Patent
Wang et al.

(10) Patent No.: US 11,634,640 B2
(45) **Date of Patent: *Apr. 25, 2023**

(54) LIQUID CRYSTAL COMPOSITION AND LIQUID CRYSTAL DISPLAY DEVICE HAVING SAME

(71) Applicant: Jiangsu Hecheng Display Technology Co., Ltd., Yangzhong (CN)

(72) Inventors: Li Wang, Yangzhong (CN); Haibing Xu, Yangzhong (CN); Pengfei Li, Yangzhong (CN); Di He, Yangzhong (CN); Rui Jin, Yangzhong (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 51 days.

This patent is subject to a terminal disclaimer.

(21) Appl. No.: 16/632,677

(22) PCT Filed: Sep. 25, 2018

(86) PCT No.: PCT/CN2018/107280

§ 371 (c)(1),
(2) Date: Jan. 21, 2020

(87) PCT Pub. No.: WO2019/062700

PCT Pub. Date: Apr. 4, 2019

(65) Prior Publication Data

US 2021/0017450 A1 Jan. 21, 2021

(30) Foreign Application Priority Data

Sep. 28, 2017 (CN) ........................ 201710893675.7

(51) Int. Cl.
*C09K 19/44* (2006.01)
*G02F 1/1333* (2006.01)
*C09K 19/12* (2006.01)
*C09K 19/30* (2006.01)

(52) U.S. Cl.
CPC ............ *C09K 19/44* (2013.01); *G02F 1/1333* (2013.01); *C09K 2019/123* (2013.01); *C09K 2019/301* (2013.01); *C09K 2019/3013* (2013.01); *C09K 2019/3016* (2013.01)

(58) Field of Classification Search
CPC ... C09K 19/12; C09K 19/44; C09K 2019/123
See application file for complete search history.

(56) References Cited

U.S. PATENT DOCUMENTS

| | | | | |
|---|---|---|---|---|
| 5,178,794 A * | 1/1993 | Takatsu | C07C 43/21 252/299.6 |
| 6,896,939 B2 * | 5/2005 | Klasen-Memmer | C09K 19/42 428/1.1 |
| 8,603,358 B2 | 12/2013 | Kuriyama et al. | |
| 8,642,142 B2 | 2/2014 | Hattori et al. | |
| 10,208,251 B2 | 2/2019 | Hirschmann et al. | |
| 11,155,752 B2 * | 10/2021 | Han | C09K 19/42 |
| 11,162,028 B2 * | 11/2021 | Zhu | C09K 19/3028 |
| 2004/0149957 A1 * | 8/2004 | Kelly | C09K 19/3028 252/299.63 |
| 2004/0206933 A1 * | 10/2004 | Goodby | C09K 19/3001 252/299.01 |
| 2012/0097895 A1 * | 4/2012 | Kuriyama | C09K 19/322 252/299.61 |

(Continued)

FOREIGN PATENT DOCUMENTS

| | | |
|---|---|---|
| CN | 102395651 A | 3/2012 |
| CN | 102858918 A | 1/2013 |

(Continued)

OTHER PUBLICATIONS

English translation of WO2018107911. (Year: 2018).*
English translation of CN 108203584. (Year: 2018).*

*Primary Examiner* — Chanceity N Robinson
*Assistant Examiner* — Anna Malloy
(74) *Attorney, Agent, or Firm* — Hoffmann & Baron, LLP

(57) ABSTRACT

A liquid crystal composition includes at least one compound of general formula I, at least one compound of general formula II and at least one compound of general formula III. The liquid crystal composition has a higher optical anisotropy, the relatively large elastic constants $K_{11}$ and $K_{33}$ while maintaining a relatively high clearing point, an appropriate dielectric anisotropy and a better low-temperature intersolubility. A liquid crystal display device which includes the liquid crystal composition has advantages of a fast response, a high contrast and a wide temperature range, thereby having a good display effect and a large range of applicability.

I

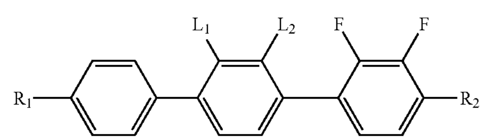

II

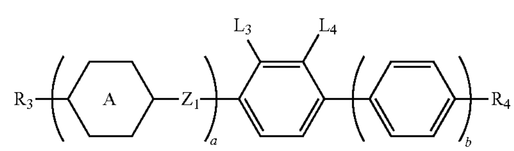

III

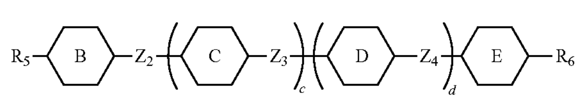

13 Claims, No Drawings

(56) References Cited

U.S. PATENT DOCUMENTS

| | | | | |
|---|---|---|---|---|
| 2015/0069296 | A1* | 3/2015 | Kuriyama | C09K 19/56 252/299.4 |
| 2016/0090530 | A1 | 3/2016 | Saito et al. | |
| 2016/0108314 | A1* | 4/2016 | Saito | C09K 19/3068 252/299.61 |
| 2018/0134959 | A1* | 5/2018 | Lee | C09K 19/44 |
| 2019/0345386 | A1* | 11/2019 | Han | C09K 19/44 |
| 2020/0123442 | A1* | 4/2020 | Zhu | G02F 1/13 |
| 2020/0339884 | A1* | 10/2020 | Ma | C09K 19/20 |

FOREIGN PATENT DOCUMENTS

| | | | | |
|---|---|---|---|---|
| CN | 103254907 A | 8/2013 | | |
| CN | 104263383 A | 1/2015 | | |
| CN | 104513666 A | 4/2015 | | |
| CN | 105176543 A | 12/2015 | | |
| CN | 108203584 A * | 6/2018 | | C09K 19/3003 |
| CN | 108728116 A | 11/2018 | | |
| CN | 108728117 A | 11/2018 | | |
| CN | 109181713 A | 1/2019 | | |
| CN | 109207163 A | 1/2019 | | |
| CN | 109207167 A | 1/2019 | | |
| CN | 109207168 A | 1/2019 | | |
| CN | 109212858 A | 1/2019 | | |
| EP | 1 013 649 A1 | 6/2000 | | |
| TW | 200927892 A | 7/2009 | | |
| TW | 201100525 A | 1/2011 | | |
| WO | WO-2018107911 A1 * | 6/2018 | | C09K 19/12 |

* cited by examiner

LIQUID CRYSTAL COMPOSITION AND LIQUID CRYSTAL DISPLAY DEVICE HAVING SAME

CROSS-REFERENCE TO RELATED APPLICATIONS

This application is the National Stage of International Application No. PCT/CN2018/107280, filed Sep. 25, 2018, which claims the benefit of Chinese Application No. 201710893675.7, filed Sep. 28, 2017, the contents of which is incorporated by reference herein.

TECHNICAL FIELD

The present invention relates to the field of liquid crystal display material, particularly to a liquid crystal composition and a liquid crystal display device having the same.

BACKGROUND ARTS

Based on the displaying mode of liquid crystal molecules, a liquid crystal display device can be classified into the types of PC (phase change), TN (twisted nematic), STN (super twisted nematic), ECB (electrically controlled birefringence), OCB (optically compensated bend), IPS (in-plane switching), VA (vertical alignment), FFS (fringe field switching), FPA (field-induced photo-reactive alignment) and the like. Based on the driving mode of the device, it is classified into the types of PM (passive matrix) and AM (active matrix). PM is classified into the static type, multiplex type and so forth, and AM is classified into TFT (thin film transistor) type, MIM (metal insulator metal) type and so forth. TFT is classified into amorphous silicon and polycrystal silicon. The latter is classified into a high-temperature type and a low-temperature type according to the manufacturing steps. Based on the types of the light source, it is classified into a reflection type utilizing a natural light, a transmission type utilizing a backlight and a semi-transmission type utilizing both the natural light and backlight.

A liquid crystal display device includes a liquid crystal composition having a nematic phase. The composition has appropriate characteristics. An AM device having good characteristics can be obtained via improving the characteristics of the composition. The correlation between the characteristics of AM device and characteristics of composition is summarized in Table 1 below. The characteristics of the composition are further illustrated based on a commercially available AM device. The temperature range of a nematic phase is associated with the workable temperature range of the device. A desirable upper limit temperature of the nematic phase is 70° C. or higher, and a desirable lower limit temperature of the nematic phase is −10° C. or lower. The viscosity of the composition is associated with the response time of the device. A short response time of the device is desirable for displaying dynamic images in the device. It is desirable to have a response time shorter than 1 millisecond. Therefore, a small viscosity of the composition is desirable. A small viscosity of the composition at a low temperature is more desirable.

TABLE 1

| Characteristics of composition and AM device | | |
|---|---|---|
| No. | Characteristics of composition | Characteristics of AM device |
| 1 | Wide temperature range of a nematic phase | Wide workable temperature range |
| 2 | Small viscosity | Short response time |
| 3 | Appropriate optical anisotropy | Large contrast |
| 4 | Large positive or negative dielectric anisotropy | Low threshold voltage, small electric power consumption, large contrast |
| 5 | Large specific resistance | Large voltage holding ratio, large contrast |
| 6 | Ultraviolet light and heat stabilities | Long service life |
| 7 | Large elastic constant | Short response time, large contrast |

A liquid crystal composition with a low power consumption and a fast response is disclosed in the prior art such as patent literature CN102858918A, however, there are problems in the prior art such as environmental issues (such as the use of chlorine-containing compounds), short service life (such as poor UV or heat stability), low contrast (such as whitening of the display screen in daylight), and inability to give consideration to the equilibrium among properties such as an appropriate dielectric anisotropy, a higher optical anisotropy, a higher clearing point, a high contrast and a good intersolubility required in LCD TVs, tablet PCs and the like (i.e., the inability to meet all indexes simultaneously).

From the perspective of the preparation of liquid crystal materials, various properties of liquid crystal materials are mutually restrained, and the improvement of a certain property index may cause changes in other properties. Therefore, it often requires creative endeavour for preparing liquid crystal materials with various suitable properties.

SUMMARY OF THE INVENTION

The object of the present invention is to provide a liquid crystal composition having characteristics such as an appropriate dielectric anisotropy, a higher clearing point, a higher optical anisotropy, a good low-temperature intersolubility, a fast response speed, the relatively large elastic constants $K_{11}$ and $K_{33}$, and a higher contrast. The liquid crystal composition can result in a good display effect of a liquid crystal display device comprising the same.

Another object of the present invention is to provide a liquid crystal display device comprising the liquid crystal composition.

In order to achieve the aforementioned objects of the present invention, the present invention provides a liquid crystal composition comprising:

at least one compound of general formula I

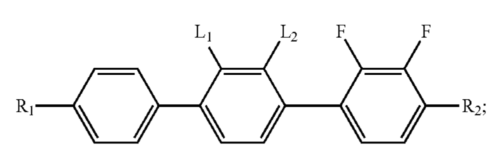

I at least one compound of general formula II

II

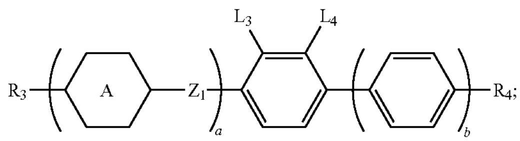

and at least one compound of general formula III

III

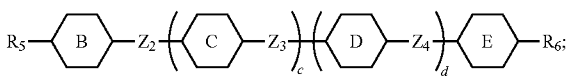

in which:

$R_1$ and $R_2$ each independently represents —H, —F, $C_{1-12}$ linear or branched alkyl or alkoxy, $C_{3-6}$ cycloalkyl, $C_{2-12}$ alkenyl or alkenoxy, or —$OR_1$'$OR_2$', wherein one or more H of the alkyl or alkoxy and the alkenyl or alkenoxy can be substituted by F, wherein $R_1$' represents $C_{1-12}$ alkylene or $C_{2-12}$ alkenylene, $R_2$' represents $C_{1-12}$ alkyl or $C_{2-12}$ alkenyl;

$R_3$ and $R_4$ each independently represents —H, —F, $C_{1-12}$ linear or branched alkyl or alkoxy, $C_{3-6}$ cycloalkyl, $C_{2-12}$ alkenyl or alkenoxy, or —$OR_3$' $OR_4$', wherein one or more H of the alkyl or alkoxy and the alkenyl or alkenoxy can be substituted by F, wherein $R_3$' represents $C_{1-12}$ alkylene or $C_{2-12}$ alkenylene, $R_4$' represents $C_{1-12}$ alkyl or $C_{2-12}$ alkenyl;

$R_5$ and $R_6$ each independently represents —H, —F, $C_{1-12}$ linear or branched alkyl or alkoxy, $C_{3-6}$ cycloalkyl, or $C_{2-12}$ alkenyl or alkenoxy;

$Z_1$, $Z_2$, $Z_3$ and $Z_4$ each independently represents single bond, —COO—, —OCO—, —$CH_2O$—, —$OCH_2$— or —$CH_2CH_2$—;

$L_1$ and $L_2$ each independently represents —H, —F, —Cl, —CN or —NCS;

$L_3$ and $L_4$ each independently represents —F, —Cl, —CN or —NCS;

ring

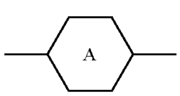

represents

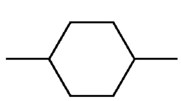

or

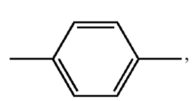, wherein one or more —$CH_2$— in

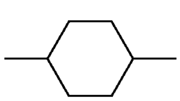

can be replaced by —O—, one or more H on

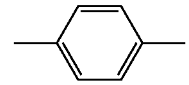

can be substituted by halogen;

ring

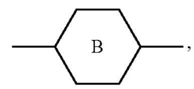, ring

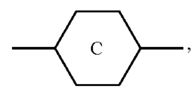, ring

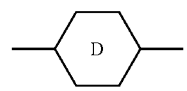

and ring

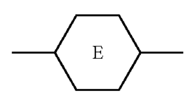

each independently represents

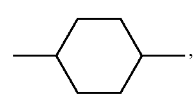, 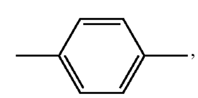,

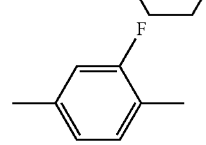

or

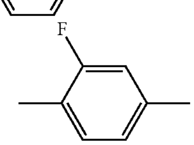;

a represents 0, 1, 2 or 3, when a is 2 or 3, $Z_1$ can be same or different, ring

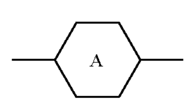

can be same or different, and when at least one $Z_1$ represents single bond, at least one ring

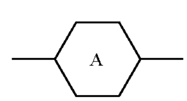

represents

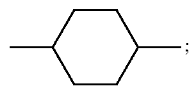

b, c, and d each independently represents 0 or 1.

In some embodiments of the present invention, $R_1$ and $R_2$ preferably each independently represents $C_{1-10}$ linear or branched alkyl or alkoxy, $C_{3-6}$ cycloalkyl, $C_{2-10}$ alkenyl or alkenoxy, or —$OR_1'OR_2'$, wherein one or more H of the alkyl or alkoxy and the alkenyl or alkenoxy can be substituted by F, wherein $R_1'$ represents $C_{1-10}$ alkylene or $C_{2-12}$ alkenylene, $R_2'$ represents $C_{1-10}$ alkyl or $C_{2-10}$ alkenyl.

In some embodiments of the present invention, the liquid crystal composition comprises at least one liquid crystal compound having an end group of —$OR_1'OR_2'$ or —$OR_3'OR_4'$.

In some embodiments of the present invention, the compound of general formula I comprises at least one liquid crystal compound having an end group of —$OR_1'OR_2'$.

In some embodiments of the present invention, the compound of general formula I provides 1-50% of the total weight of the liquid crystal composition, the compound of general formula II provides 1-80% of the total weight of the liquid crystal composition, and the compound of general formula III provides 1-85% of the total weight of the liquid crystal composition.

In some embodiments of the present invention, the compound of general formula I provides 1-40% of the total weight of the liquid crystal composition, the compound of general formula II provides 15-80% of the total weight of the liquid crystal composition, and the compound of general formula III provides 15-80% of the total weight of the liquid crystal composition.

In some embodiments of the present invention, the compound of general formula I provides 1-30% of the total weight of the liquid crystal composition, the compound of general formula II provides 20-70% of the total weight of the liquid crystal composition, and the compound of general formula III provides 20-75% of the total weight of the liquid crystal composition.

In some embodiments of the present invention, the compound of general formula I provides 1-30% of the total weight of the liquid crystal composition, the compound of general formula II provides 25-70% of the total weight of the liquid crystal composition, and the compound of general formula III provides 25-70% of the total weight of the liquid crystal composition.

In some embodiments of the present invention, the compound of general formula I provides 1-30% of the total weight of the liquid crystal composition, the compound of general formula II provides 25-65% of the total weight of the liquid crystal composition, and the compound of general formula III provides 25-68% of the total weight of the liquid crystal composition.

In some embodiments of the present invention, the compound of general formula I provides 1-30% of the total weight of the liquid crystal composition, the compound of general formula II provides 25-60% of the total weight of the liquid crystal composition, and the compound of general formula III provides 25-65% of the total weight of the liquid crystal composition.

In some embodiments of the present invention, the compound of general formula I provides 1-30% of the total weight of the liquid crystal composition, the compound of general formula II provides 30-60% of the total weight of the liquid crystal composition, and the compound of general formula III provides 30-65% of the total weight of the liquid crystal composition.

In some embodiments of the present invention, the compound of general formula I is selected from a group consisting of the following compounds:

I-1

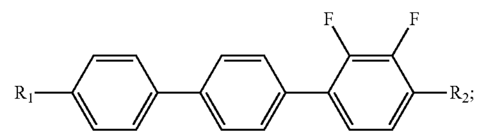

I-2

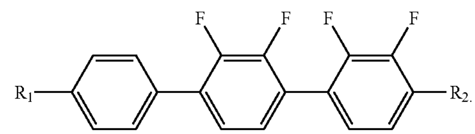

In some embodiments of the present invention, the compound of general formula I-1 is further preferably selected from a group consisting of the following compounds:

I-1-1

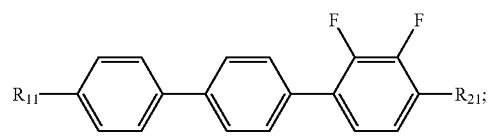

I-1-2

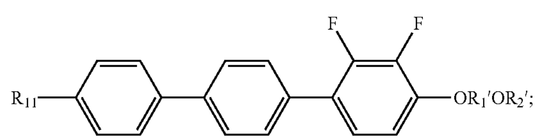

I-1-3

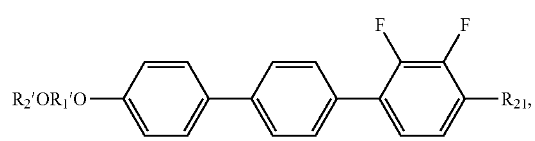

in which, $R_{11}$ and $R_{21}$ each independently represents $C_{1-10}$ linear or branched alkyl or alkoxy, $C_{3-6}$ cycloalkyl, or $C_{2-10}$ alkenyl or alkenoxy, wherein one or more H of the alkyl or alkoxy and the alkenyl or alkenoxy can be substituted by F;

$R_1'$ represents $C_{1-10}$ alkylene or $C_{2-10}$ alkenylene, $R_2'$ represents $C_{1-10}$ alkyl or $C_{2-10}$ alkenyl.

In some embodiments of the present invention, the compound of general formula I-2 is further preferably selected from a group consisting of the following compounds:

I-2-1

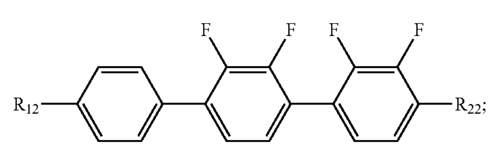

-continued

I-2-2

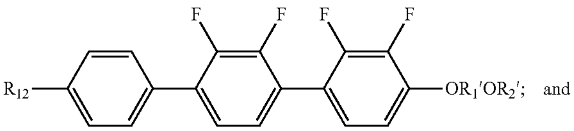

I-2-3

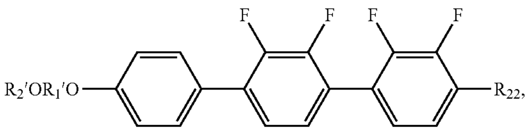

in which, $R_{12}$ and $R_{22}$ each independently represents $C_{1-10}$ linear or branched alkyl or alkoxy, $C_{3-6}$ cycloalkyl, or $C_{2-10}$ alkenyl or alkenoxy, wherein one or more H of the alkyl or alkoxy and the alkenyl or alkenoxy can be substituted by F;

$R_1'$ represents $C_{1-10}$ alkylene or $C_{2-10}$ alkenylene, $R_2'$ represents $C_{1-10}$ alkyl or $C_{2-10}$ alkenyl.

In some embodiments of the present invention, the compound of general formula I-1-1 is still further preferably selected from a group consisting of the following compounds:

I-1-1-1

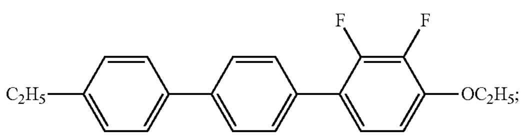

I-1-1-2

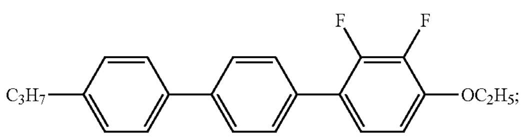

I-1-1-3

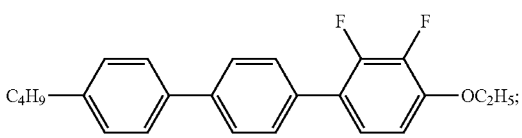

I-1-1-4

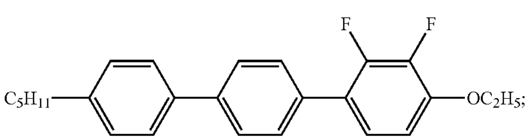

I-1-1-5

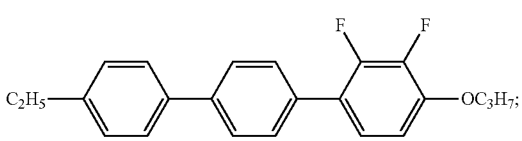

I-1-1-6

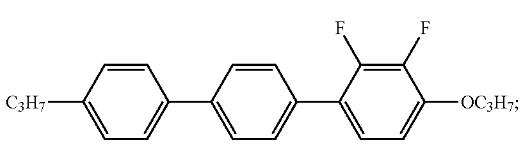

-continued

I-1-1-7

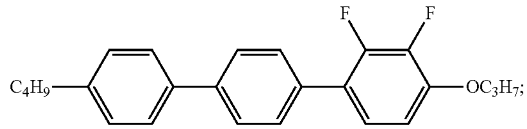

I-1-1-8

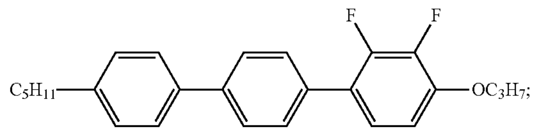

I-1-1-9

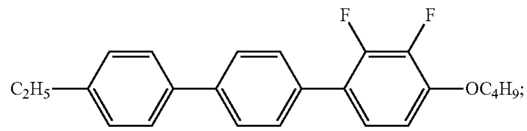

I-1-1-10

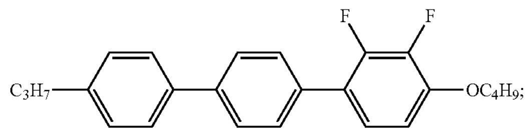

I-1-1-11

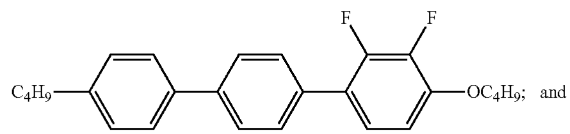

I-1-1-12

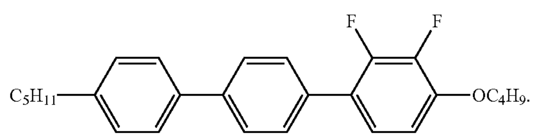

In some embodiments of the present invention, the compound of general formula I-1-2 is still further preferably selected from a group consisting of the following compounds:

I-1-2-1

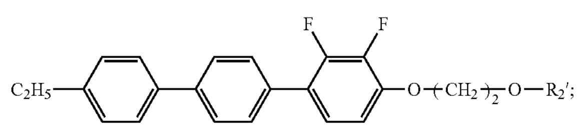

I-1-2-2

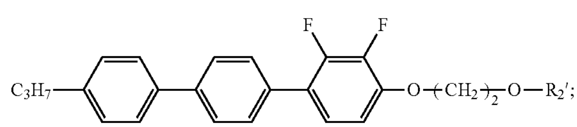

I-1-2-3

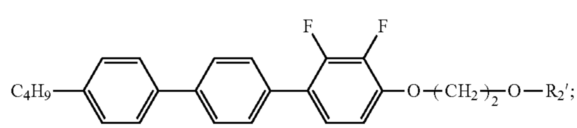

-continued

I-1-2-4

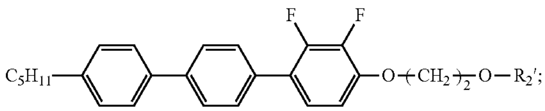

I-1-2-5

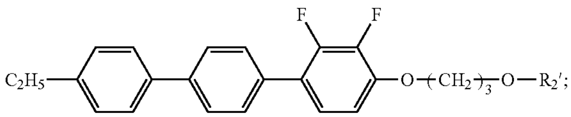

I-1-2-6

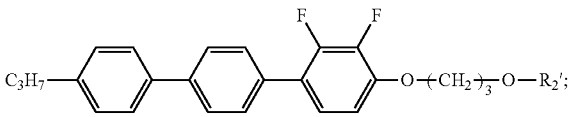

I-1-2-7

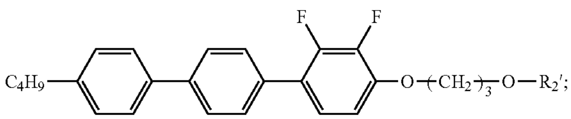

I-1-2-8

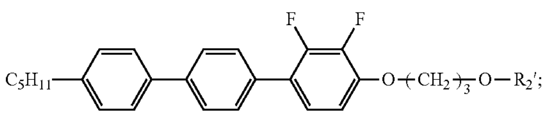

I-1-2-9

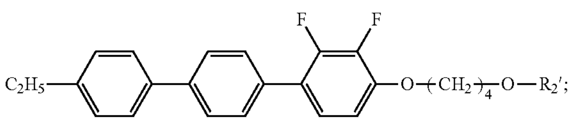

I-1-2-10

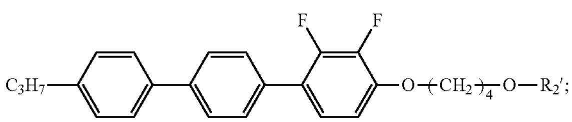

I-1-2-11

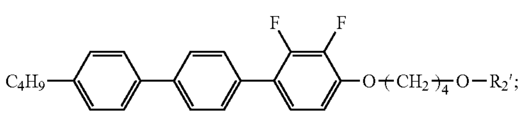

and

I-1-2-12

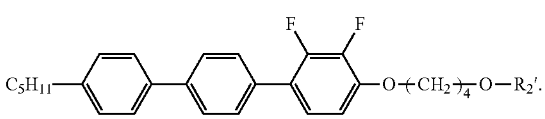

In some embodiments of the present invention, the compound of general formula I-1-3 is still further preferably selected from a group consisting of the following compounds:

I-1-3-1

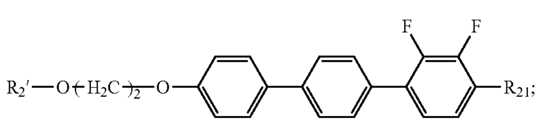

-continued

I-1-3-2

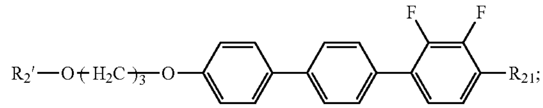

I-1-3-3

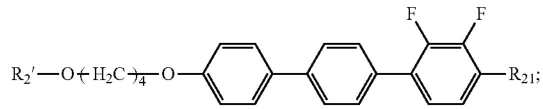

I-1-3-4

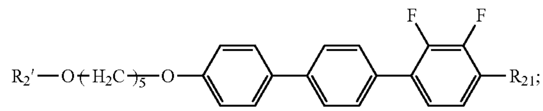

and

I-1-3-5

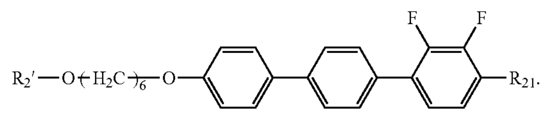

In some embodiments of the present invention, the compound of general formula I-2-1 is still further preferably selected from a group consisting of the following compounds:

I-2-1-1

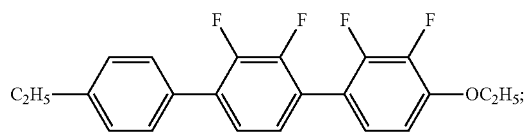

I-2-1-2

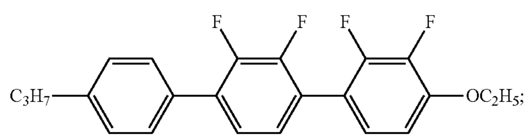

I-2-1-3

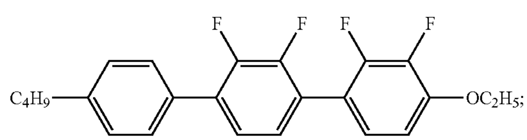

I-2-1-4

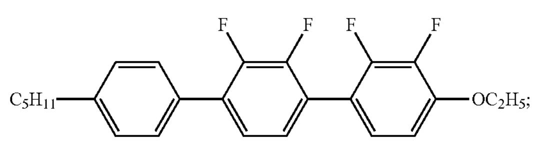

I-2-1-5

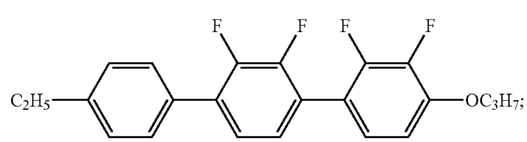

-continued

I-2-1-6

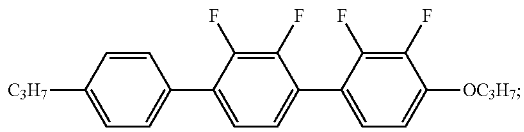

I-2-1-7

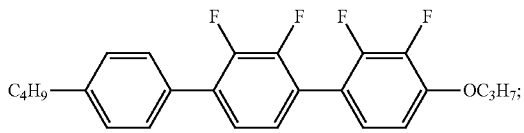

I-2-1-8

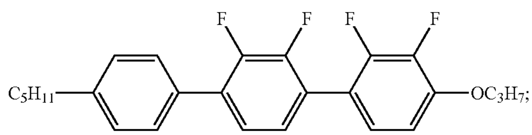

I-2-1-9

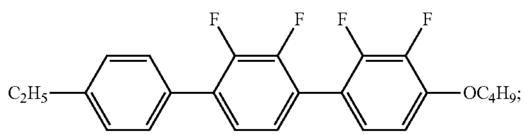

I-2-1-10

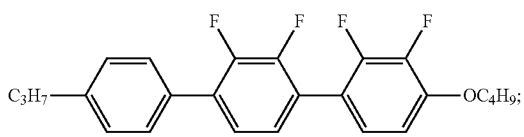

I-2-1-11

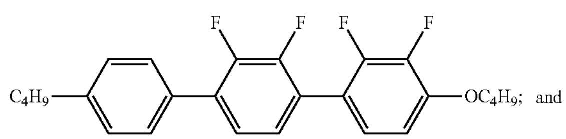

I-2-1-12

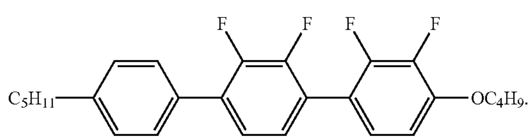

In some embodiments of the present invention, the compound of general formula I-2-2 is still further preferably selected from a group consisting of the following compounds:

I-2-2-1

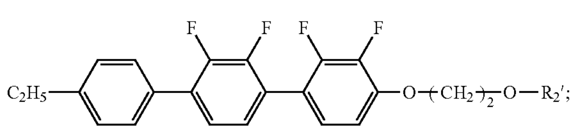

I-2-2-2

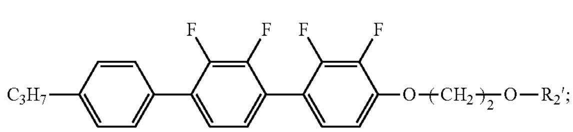

-continued

I-2-2-3

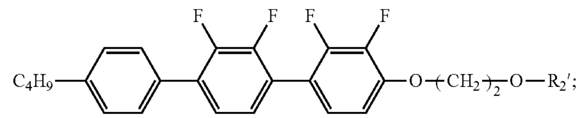

I-2-2-4

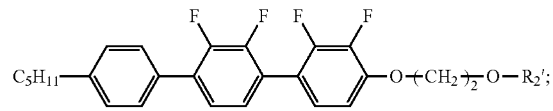

I-2-2-5

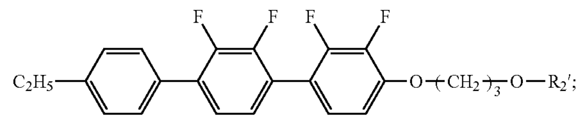

I-2-2-6

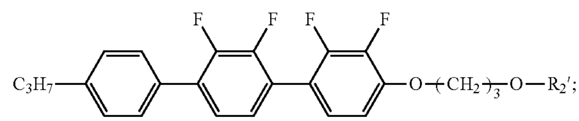

I-2-2-7

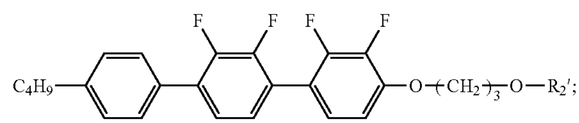

I-2-2-8

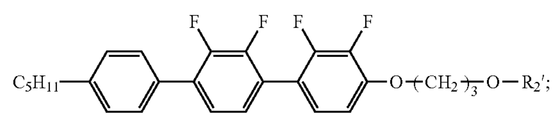

I-2-2-9

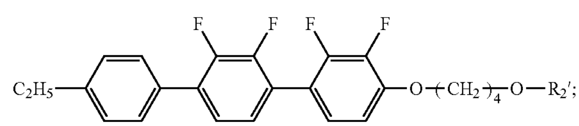

I-2-2-10

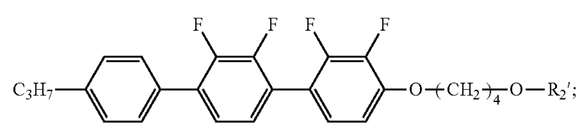

I-2-2-11

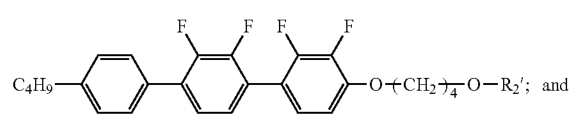

I-2-2-12

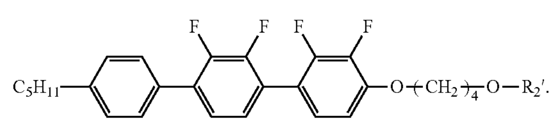

In some embodiments of the present invention, the compound of general formula I-2-3 is still further preferably selected from a group consisting of the following compounds:

I-2-3-1

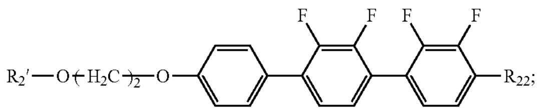

I-2-3-2

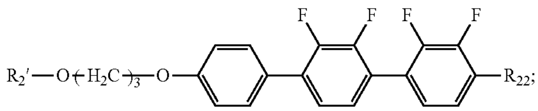

I-2-3-3

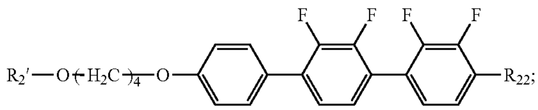

I-2-3-4

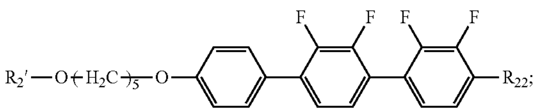

and

I-2-3-5

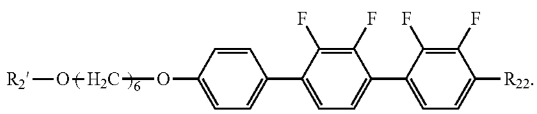

In some embodiments of the present invention, $R_2'$ is preferably $C_{1-10}$ alkyl or $C_{2-10}$ alkenyl.

The compound of general formula I has a larger optical anisotropy and a higher clearing point, such that the liquid crystal composition comprising the compound of general formula I has a higher contrast and a higher clearing point.

In some embodiments of the present invention, the compound of general formula II is selected from a group consisting of the following compounds:

II-1

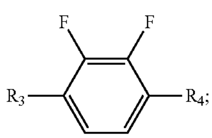

II-2

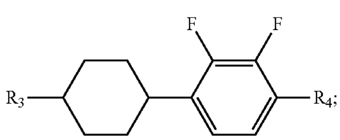

II-3

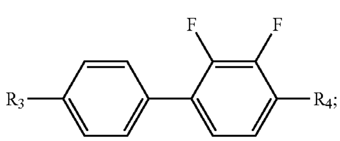

II-4

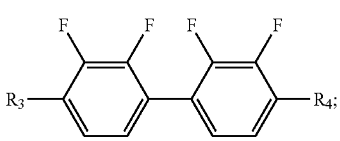

-continued

II-5

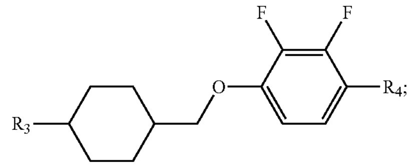

II-6

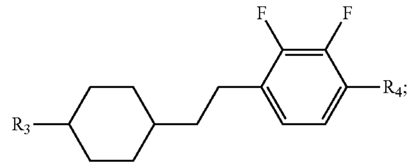

II-7

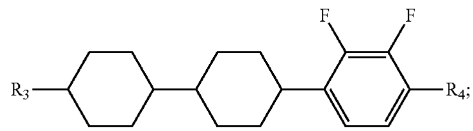

II-8

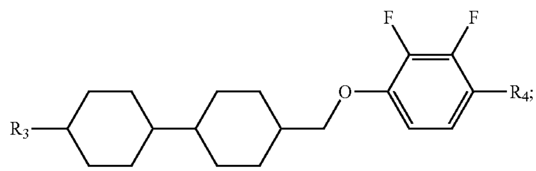

II-9

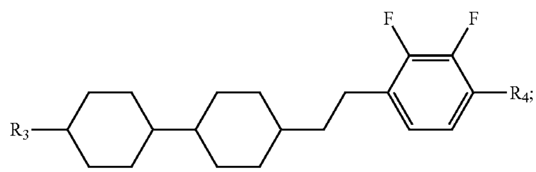

II-10

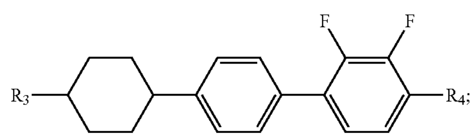

II-11

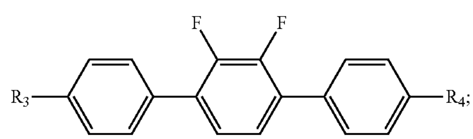

II-12

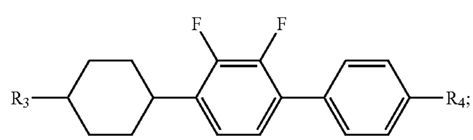

II-13

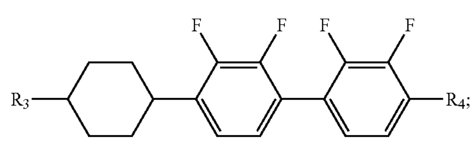

II-14

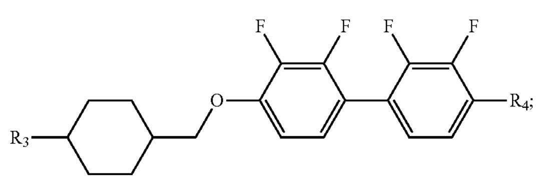

-continued

II-15

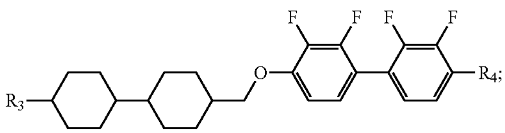

and

II-16

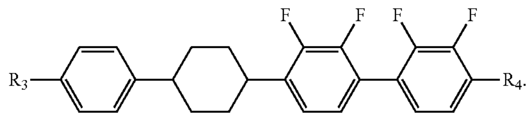

In some embodiments of the present invention, $R_3$ and $R_4$ each independently represents $C_{1-6}$ linear or branched alkyl or alkoxy, $C_{3-6}$ cycloalkyl, $C_{2-6}$ alkenyl or alkenoxy, or —$OR_3'OR_4'$, wherein one or more H of the alkyl or alkoxy and the alkenyl or alkenoxy can be substituted by F, wherein $R_3'$ represents $C_{1-10}$ alkylene or $C_{2-10}$ alkenylene, $R_4'$ represents $C_{1-10}$ alkyl or $C_{2-10}$ alkenyl.

In some embodiments of the present invention, the compound of general formula II comprises at least one liquid crystal compound having an end group of —$OR_3'OR_4'$.

In some embodiments of the present invention, $R_3'$ is preferably $C_{2-10}$ alkylene or $C_{2-6}$ alkenylene, particularly preferably $C_{2-10}$ alkylene.

In some embodiments of the present invention, in the compounds of general formulas II-1, II-2, II-3, II-4, II-5, II-6, II-7, II-8, II-9, II-10, II-11, II-12, II-13, II-14, II-15 and II-16, $R_3$ is each independently preferably selected from the following groups:

$$—O—(CH_2)_2—O—R_4',\quad —O—(CH_2)_3—O—R_4',$$
$$—O—(CH_2)_4—O—R_4',\quad —O—(CH_2)_6—O—R_4',$$
$$—O—(CH_2)_8—O—R_4',\ \text{or}\ —O—(CH_2)_{10}—O—R_4',$$

$R_4$ is each independently preferably $C_{1-6}$ linear or branched alkyl or alkoxy, $C_{3-6}$ cycloalkyl, or $C_{2-6}$ alkenyl or alkenoxy, wherein $R_4'$ is preferably $C_{2-10}$ alkyl or $C_{2-6}$ alkenyl, particularly preferably $C_{2-10}$ alkyl.

In some embodiments of the present invention, in the compounds of general formulas II-1, II-2, II-3, II-4, II-5, II-6, II-7, II-8, II-9, II-10, II-11, II-12, II-13, II-14, II-15 and II-16, $R_4$ is each independently preferably selected from the following groups:

$$—O—(CH_2)_2—O—R_4',\quad —O—(CH_2)_3—O—R_4',$$
$$—O—(CH_2)_4—O—R_4',\quad —O—(CH_2)_6—O—R_4',$$
$$—O—(CH_2)_8—O—R_4',\ \text{or}\ —O—(CH_2)_{10}—O—R_4',$$

$R_3$ is each independently preferably $C_{1-6}$ linear or branched alkyl or alkoxy, $C_{3-6}$ cycloalkyl, or $C_{2-6}$ alkenyl or alkenoxy, wherein $R_4'$ is preferably $C_{2-10}$ alkyl or $C_{2-6}$ alkenyl, particularly preferably $C_{2-10}$ alkyl.

In some embodiments of the present invention, in the compounds of general formulas II-1, II-2, II-3, II-4, II-5, II-6, II-7, II-8, II-9, II-10, II-11, II-12, II-13, II-14, II-15 and II-16, $R_3$ and $R_4$ are each independently preferably $C_{1-6}$ linear or branched alkyl or alkoxy, $C_{3-6}$ cycloalkyl, or $C_{2-6}$ alkenyl or alkenoxy.

In some embodiments of the present invention, the compound of general formula III is selected from a group consisting of the following compounds:

III-1

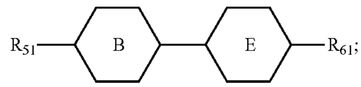

III-2

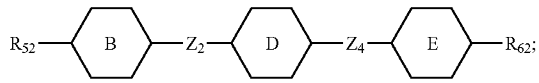

and

III-3

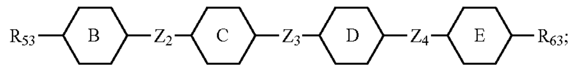

in which, $R_{51}$, $R_{52}$, $R_{53}$, $R_{61}$, $R_{62}$ and $R_{63}$ each independently represents —H, —F, $C_{1-12}$ alkyl or alkoxy, $C_{2-12}$ alkenyl or alkenoxy,

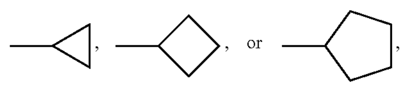

wherein one or more H of the alkyl or alkoxy and the alkenyl or alkenoxy can be substituted by F;

$Z_2$, $Z_3$ and $Z_4$ each independently represents single bond, —COO—, —OCO—, —$CH_2O$—, —$OCH_2$— or —$CH_2CH_2$—;

ring

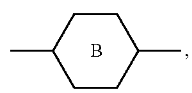

ring

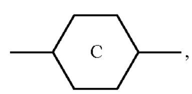

ring

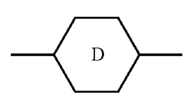

and ring

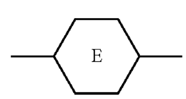

each independently represents

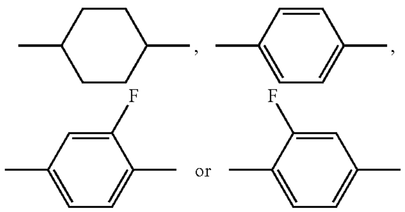

In some embodiments of the present invention, the compound of general formula III-1 is selected from a group consisting of the following compounds:

III-1-1

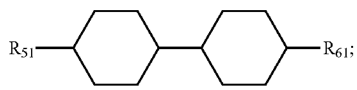

III-1-2

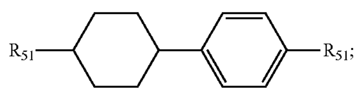

III-1-3

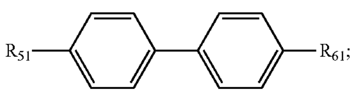

and

III-1-4

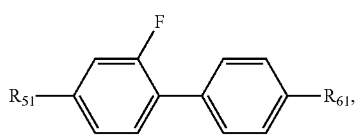

in some embodiments of the present invention, the compound of general formula III-2 is selected from a group consisting of the following compounds:

III-2-1

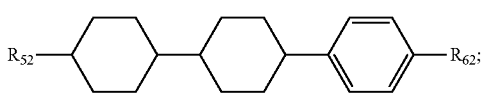

III-2-2

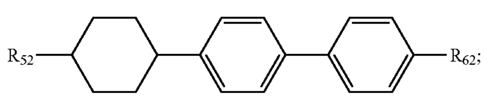

III-2-3

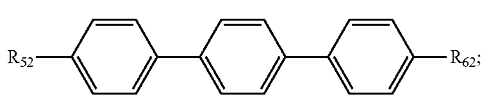

III-2-4

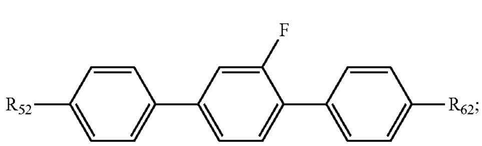

and

III-2-5

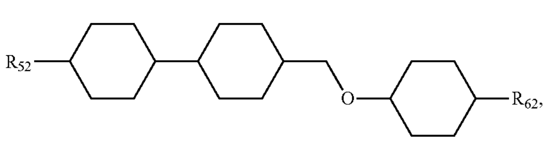

in some embodiments of the present invention, the compound of general formula III-3 is selected from a group consisting of the following compounds:

III-3-1

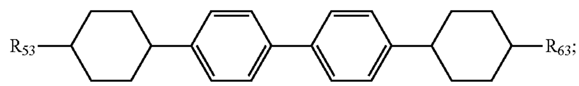

III-3-2

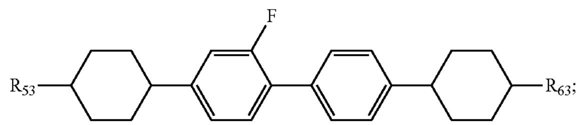

III-3-3

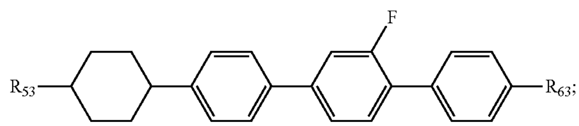

III-3-4

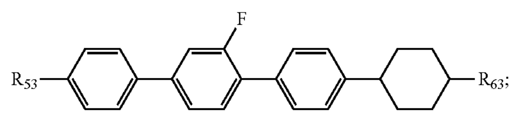

and

III-3-5

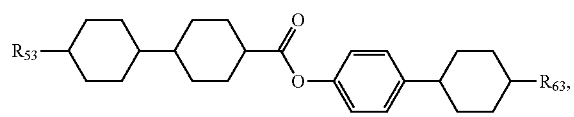

in which, $R_{51}$, $R_{52}$, $R_{53}$, $R_{61}$, $R_{62}$ and $R_{63}$ each independently represents H, $C_{1-7}$ alkyl or alkoxy, or $C_{2-7}$ alkenyl or alkenoxy.

In some embodiments of the present invention, the compound of general formula III-1-1 is selected from a group consisting of the following compounds:

III-1-1-1

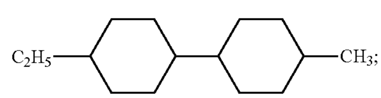

III-1-1-2

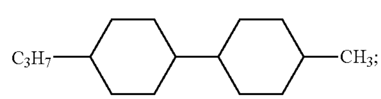

III-1-1-3

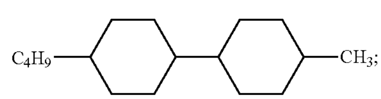

III-1-1-4

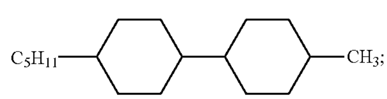

III-1-1-5

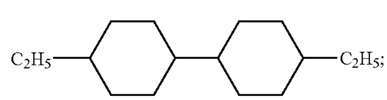

III-1-1-6

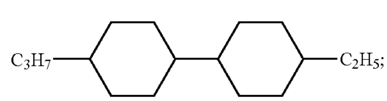

-continued

III-1-1-7

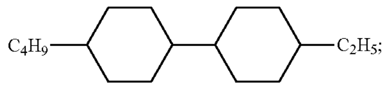

III-1-1-8

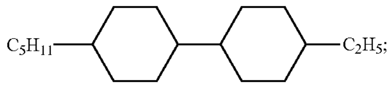

III-1-1-9

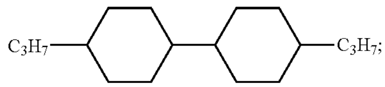

III-1-1-10

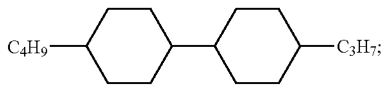

III-1-1-11

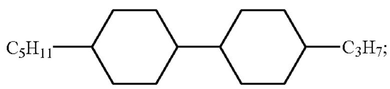

III-1-1-12

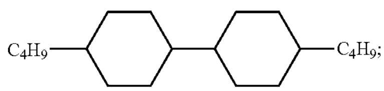

III-1-1-13

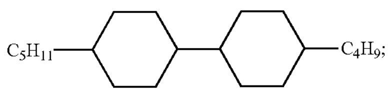

III-1-1-14

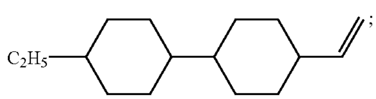

III-1-1-15

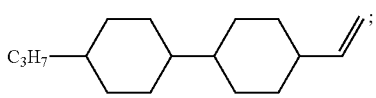

III-1-1-16

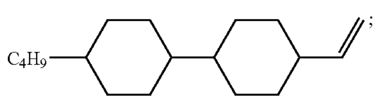

III-1-1-17

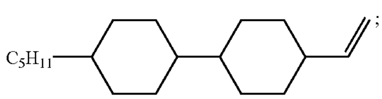

III-1-1-18

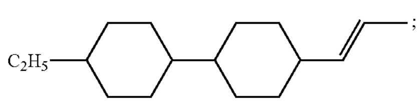

III-1-1-19

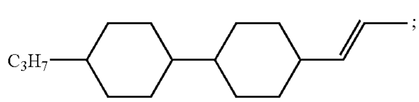

III-1-1-20

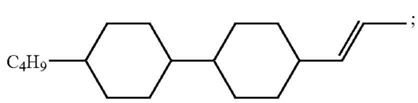

and

III-1-1-21

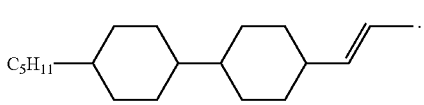

In some embodiments of the present invention, the compound of general formula III-1-2 is selected from a group consisting of the following compounds:

III-1-2-1

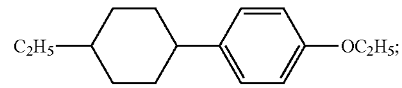

III-1-2-2

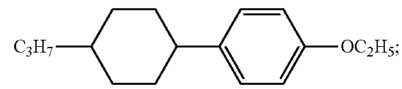

III-1-2-3

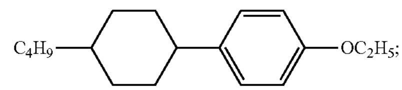

III-1-2-4

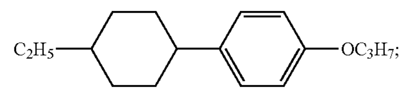

III-1-2-5

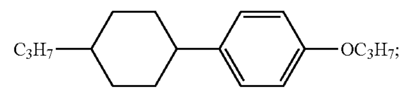

III-1-2-6

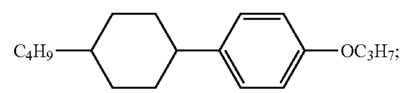

III-1-2-7

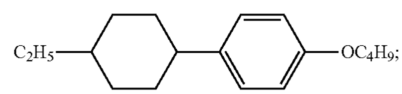

III-1-2-8

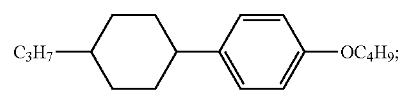

and

III-1-2-9

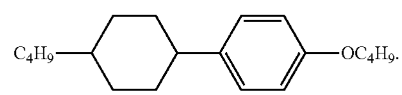

In some embodiments of the present invention, the compound of general formula III-1-3 is selected from a group consisting of the following compounds:

III-1-3-1

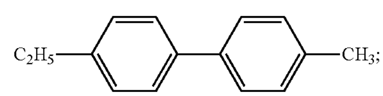

III-1-3-2

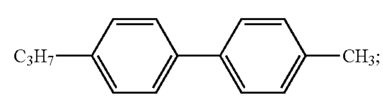

III-1-3-3

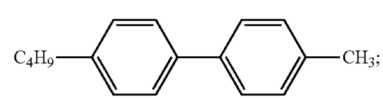

III-1-3-4

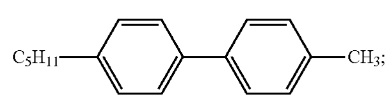

-continued
III-1-3-5
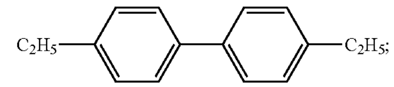
III-1-3-6
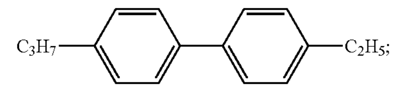
III-1-3-7
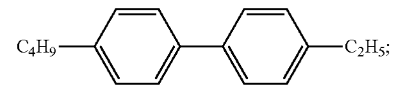
III-1-3-8
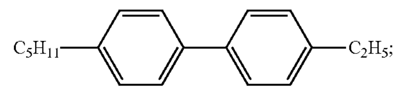
III-1-3-9
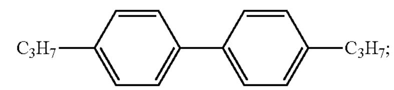
III-1-3-10
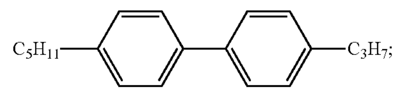
III-1-3-11
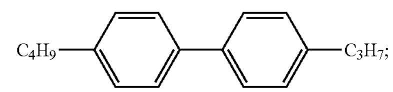
III-1-3-12
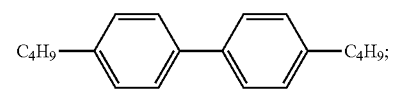
III-1-3-13
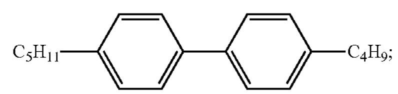
III-1-3-14
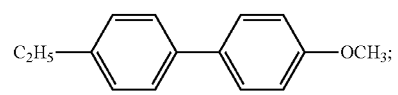
III-1-3-15
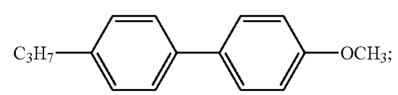
III-1-3-16
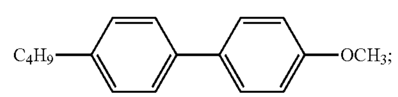
III-1-3-17
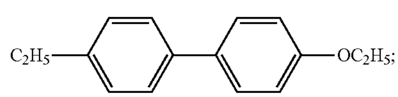
III-1-3-18
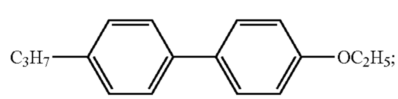
III-1-3-19
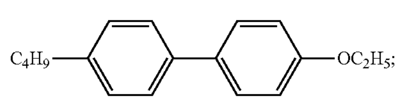
III-1-3-20
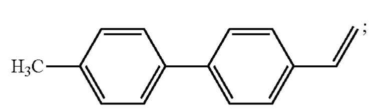
-continued
III-1-3-21
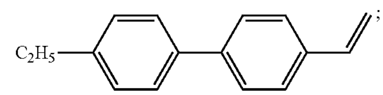
III-1-3-22
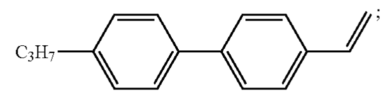
III-1-3-23
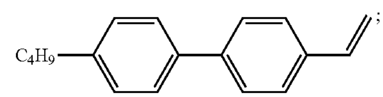
III-1-3-24
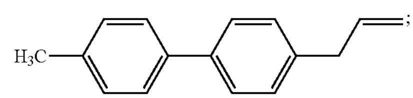
III-1-3-25
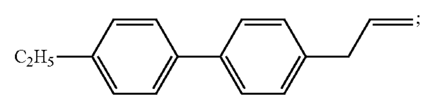
III-1-3-26
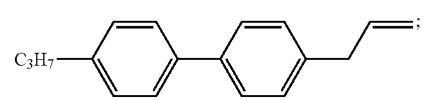
III-1-3-27
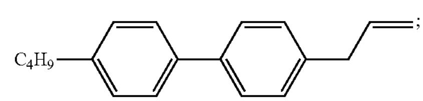
III-1-3-28
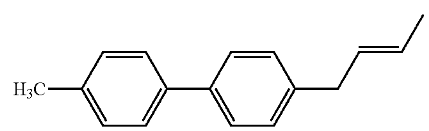
III-1-3-29
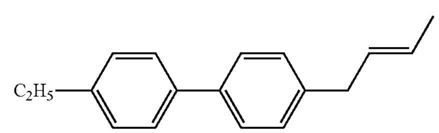
III-1-3-30
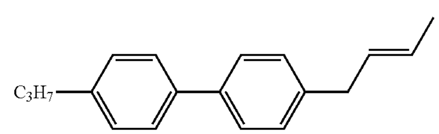
III-1-3-31
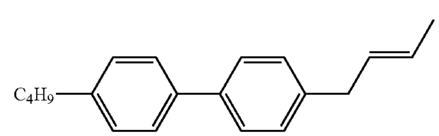
III-1-3-32
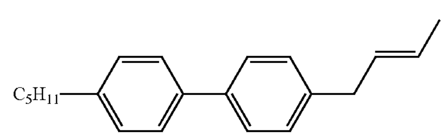
III-1-3-33
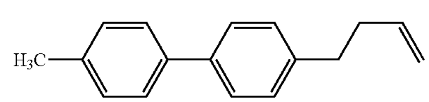

-continued

III-1-3-34

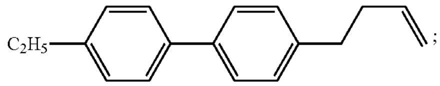

III-1-3-35

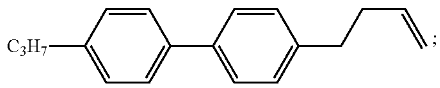

III-1-3-36

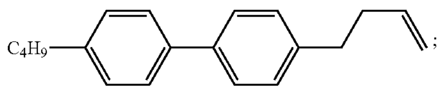

III-1-3-37

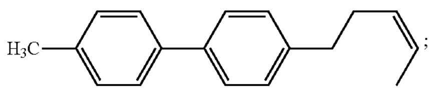

III-1-3-38

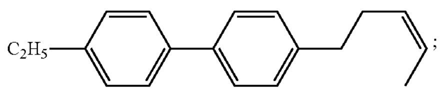

III-1-3-39

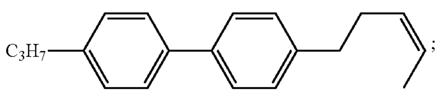

and

III-1-3-40

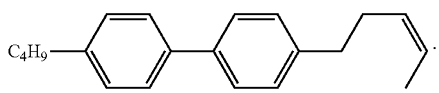

In some embodiments of the present invention, the compound of general formula III-1-4 is selected from a group consisting of the following compounds:

III-1-4-1

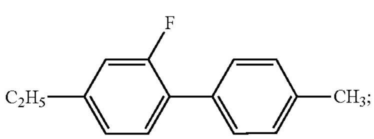

III-1-4-2

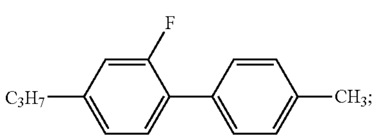

III-1-4-3

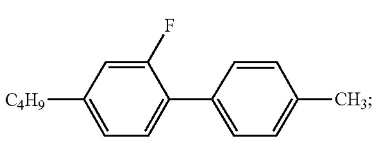

III-1-4-4

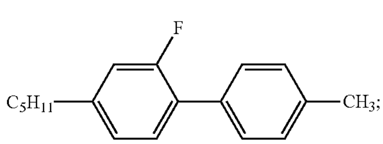

III-1-4-5

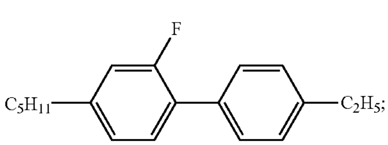

-continued

III-1-4-6

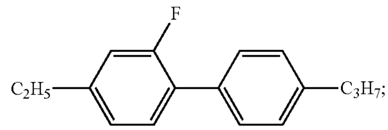

III-1-4-7

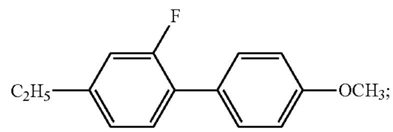

III-1-4-8

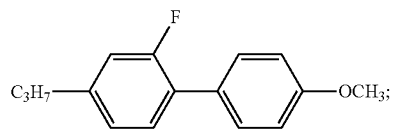

III-1-4-9

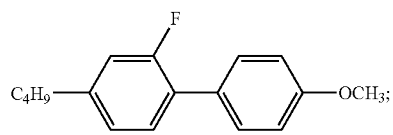

III-1-4-10

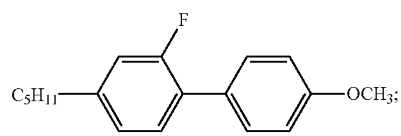

III-1-4-11

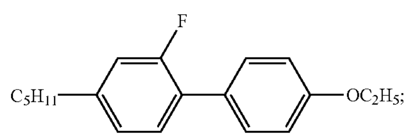

and

III-1-4-12

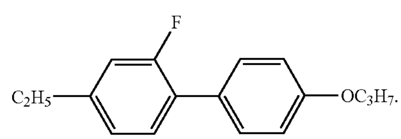

In some embodiments of the present invention, the compound of general formula III-2-1 is selected from a group consisting of the following compounds:

III-2-1-1

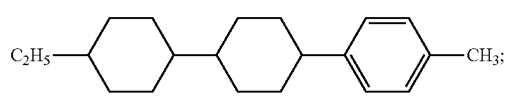

III-2-1-2

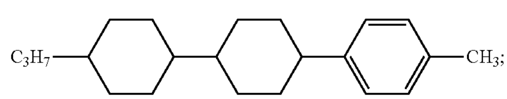

III-2-1-3

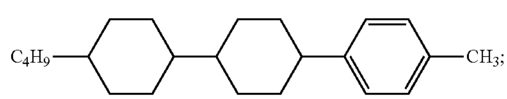

III-2-1-4

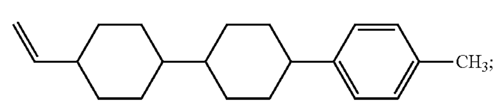

III-2-1-5
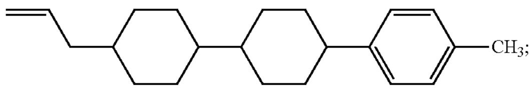
III-2-1-6
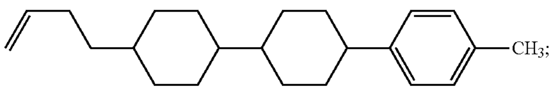
III-2-1-7
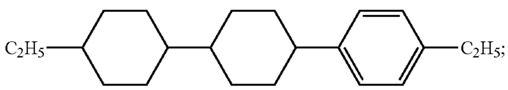
III-2-1-8
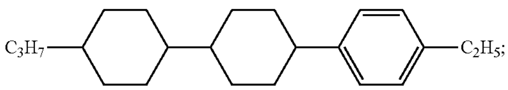
III-2-1-9
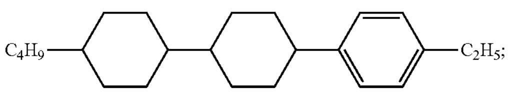
III-2-1-10
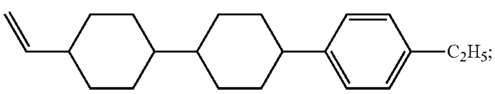
III-2-1-11
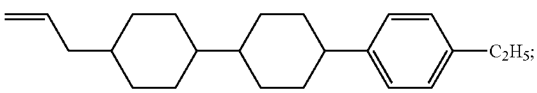
III-2-1-12
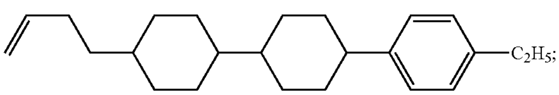
III-2-1-13
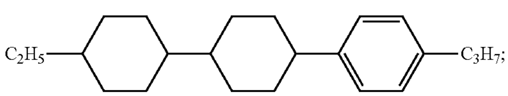
III-2-1-14
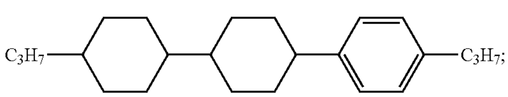
III-2-1-15
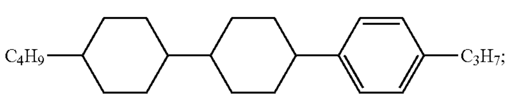
III-2-1-16
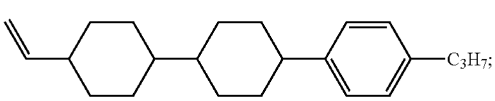
III-2-1-17
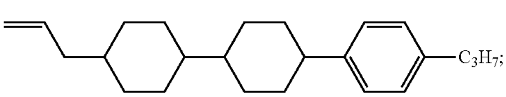
and
III-2-1-18
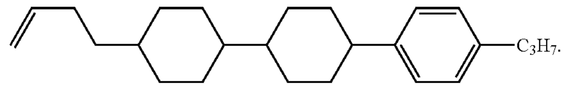
In some embodiments of the present invention, the compound of general formula III-2-2 is selected from a group consisting of the following compounds:
III-2-2-1
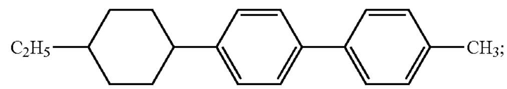
III-2-2-2
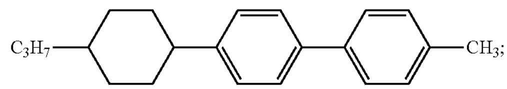
III-2-2-3
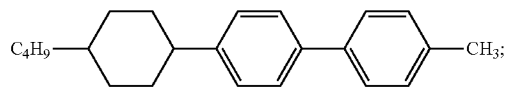
III-2-2-4
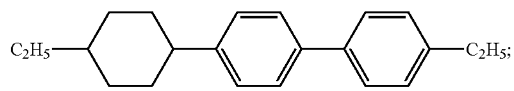
III-2-2-5
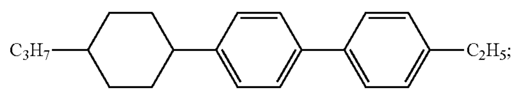
III-2-2-6
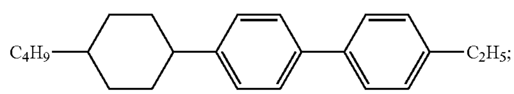
III-2-2-7
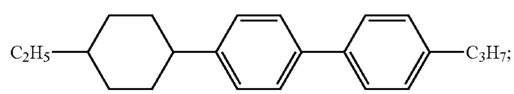
III-2-2-8
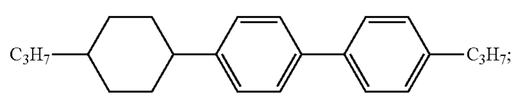
III-2-2-9
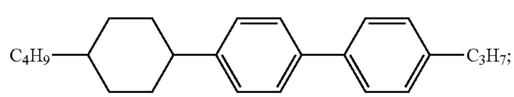
III-2-2-10
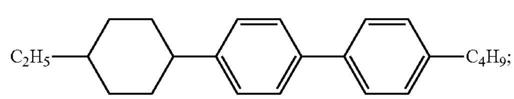
III-2-2-11
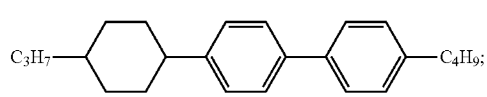
and -continued

III-2-2-12

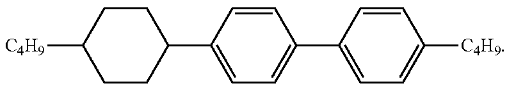

In some embodiments of the present invention, the compound of general formula III-2-3 is selected from a group consisting of the following compounds:

III-2-3-1

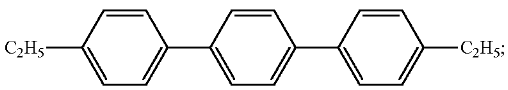

III-2-3-2

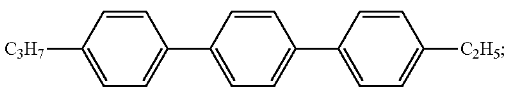

III-2-3-3

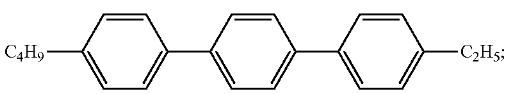

III-2-3-4

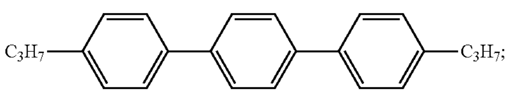

and

III-2-3-5

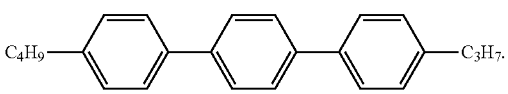

In some embodiments of the present invention, the compound of general formula III-2-4 is selected from a group consisting of the following compounds:

III-2-4-1

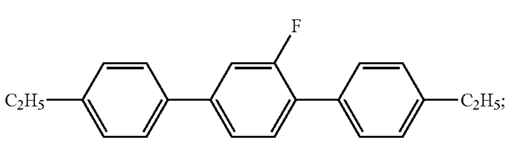

III-2-4-2

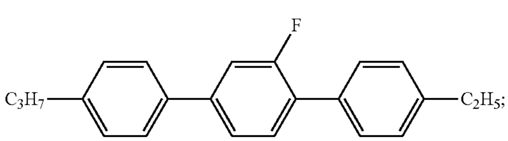

III-2-4-3

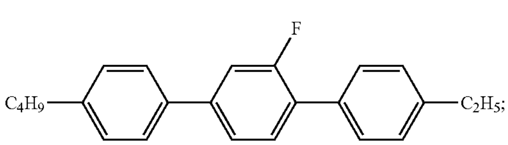

-continued

III-2-4-4

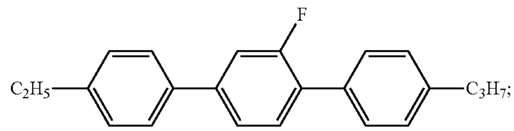

III-2-4-5

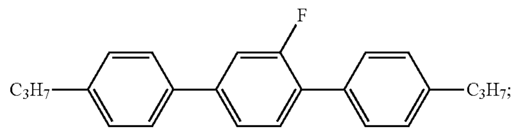

III-2-4-6

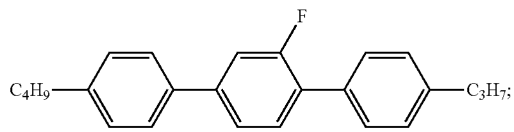

III-2-4-7

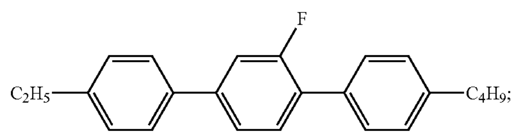

III-2-4-8

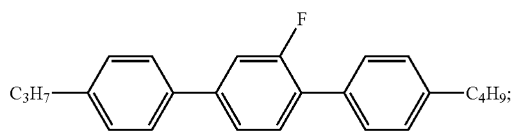

and

III-2-4-9

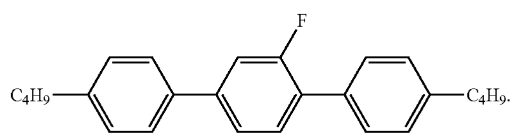

In some embodiments of the present invention, the compound of general formula III-2-5 is selected from a group consisting of the following compounds:

III-2-5-1

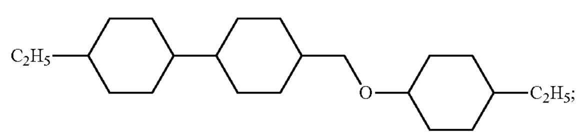

III-2-5-2

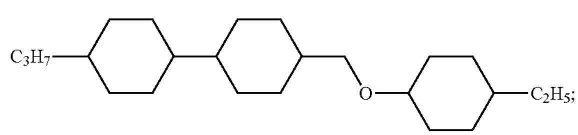

III-2-5-3

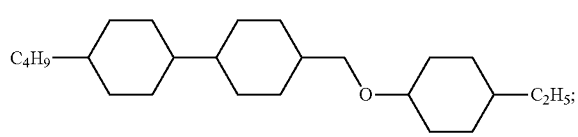

-continued
III-2-5-4
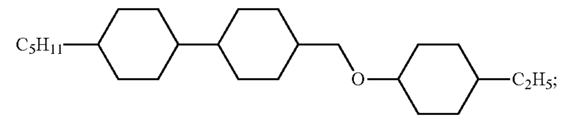
III-2-5-5
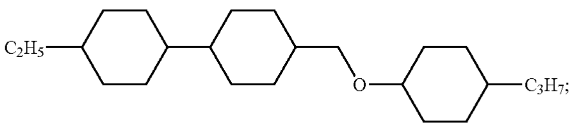
III-2-5-6
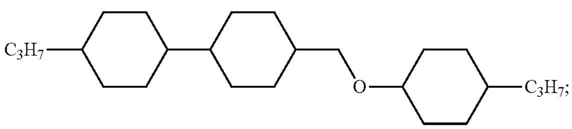
III-2-5-7
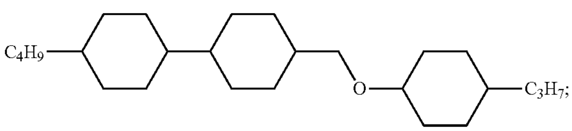
III-2-5-8
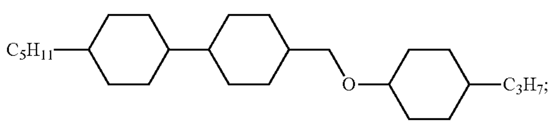
III-2-5-9
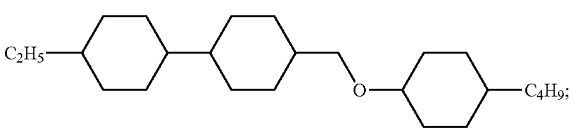
III-2-5-10
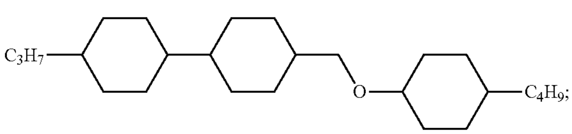
III-2-5-11
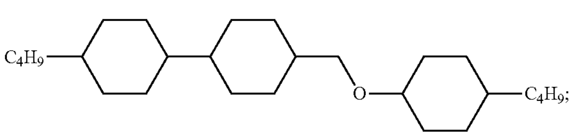
III-2-5-12
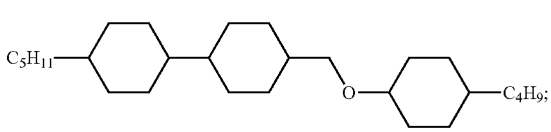
III-2-5-13
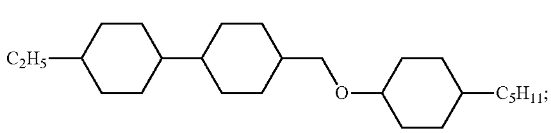
-continued
III-2-5-14
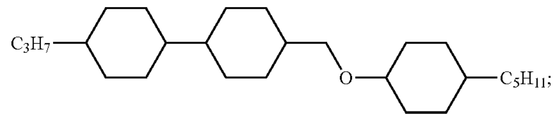
III-2-5-15
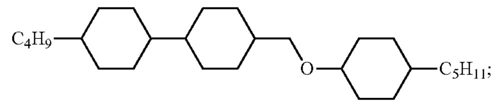
and
III-2-5-16
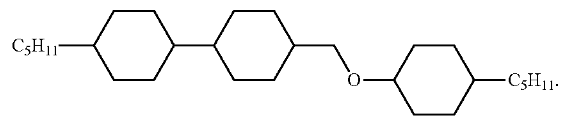
In some embodiments of the present invention, the compound of general formula III-3-1 is selected from a group consisting of the following compounds:
III-3-1-1
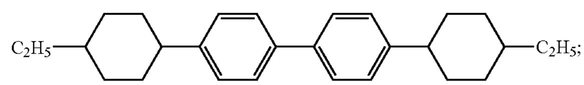
III-3-1-2
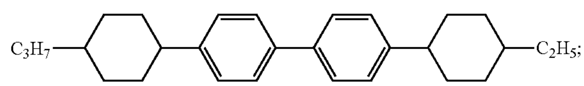
III-3-1-3
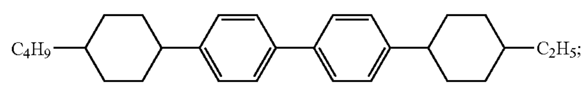
III-3-1-4
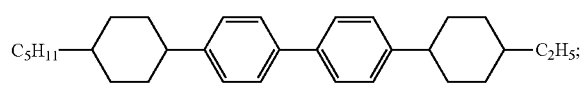
III-3-1-5
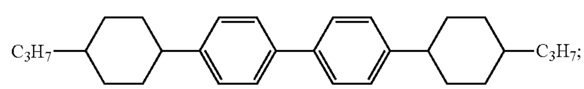
III-3-1-6
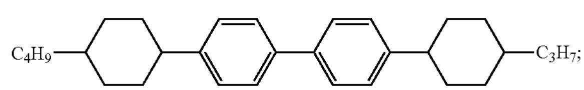
III-3-1-7
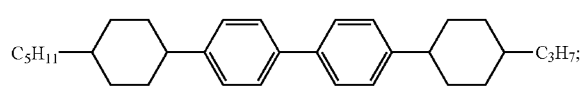
III-3-1-8
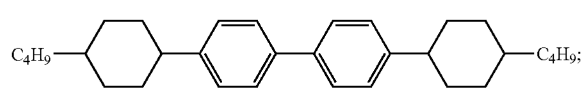
III-3-1-9
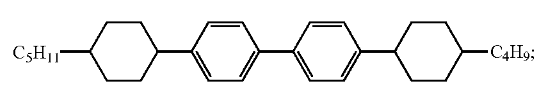
and -continued

III-3-1-10

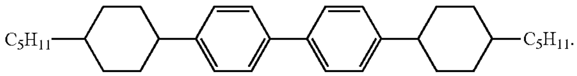

In some embodiments of the present invention, the compound of general formula III-3-2 is selected from a group consisting of the following compounds:

III-3-2-1

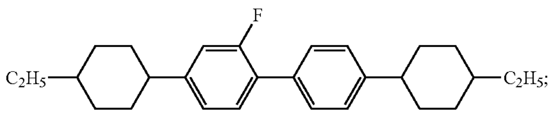

III-3-2-2

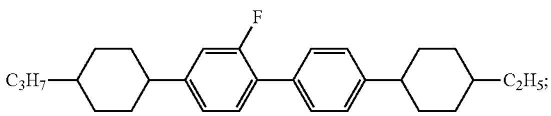

III-3-2-3

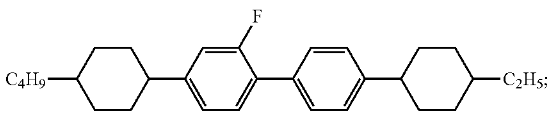

III-3-2-4

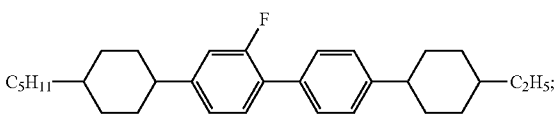

III-3-2-5

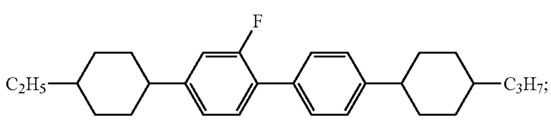

III-3-2-6

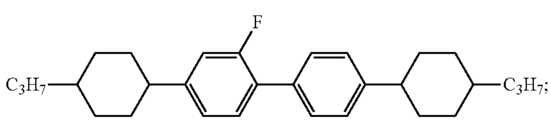

III-3-2-7

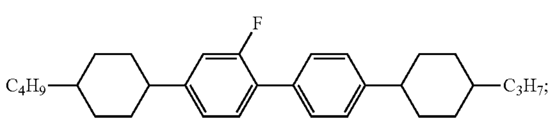

III-3-2-8

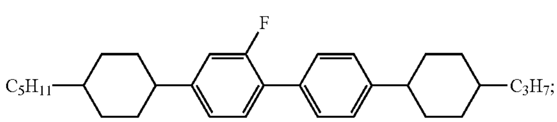

III-3-2-9

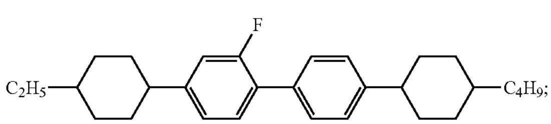

-continued

III-3-2-10

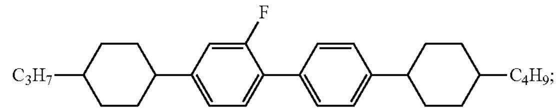

III-3-2-11

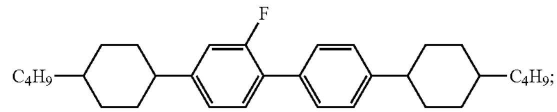

III-3-2-12

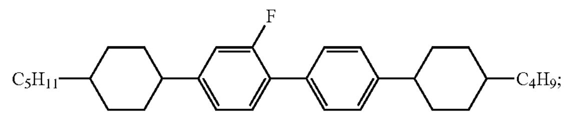

III-3-2-13

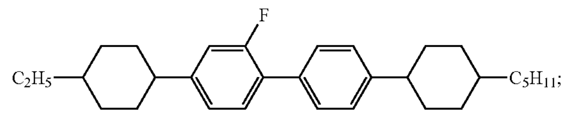

III-3-2-14

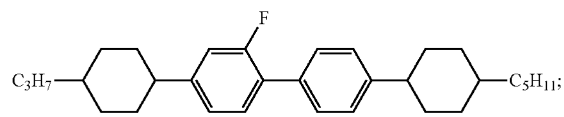

III-3-2-15

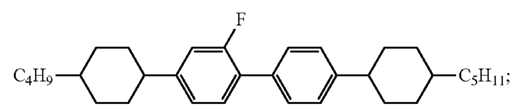

and

III-3-2-16

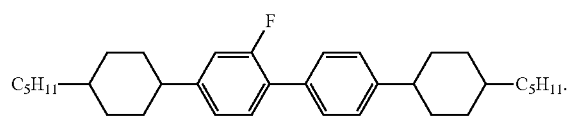

In some embodiments of the present invention, the compound of general formula III-3-3 is selected from a group consisting of the following compounds:

III-3-3-1

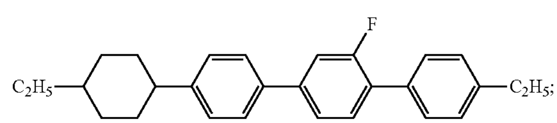

III-3-3-2

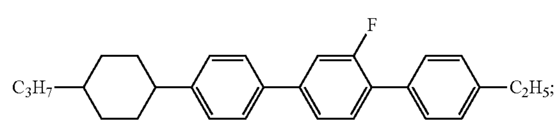

III-3-3-3

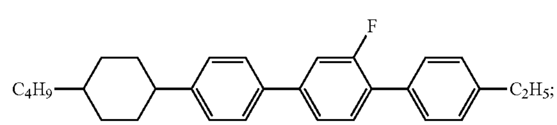

-continued
III-3-3-4
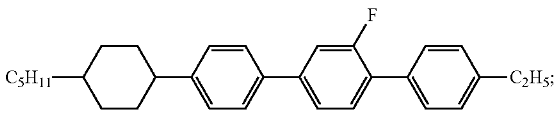
III-3-3-5
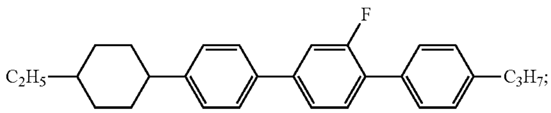
III-3-3-6
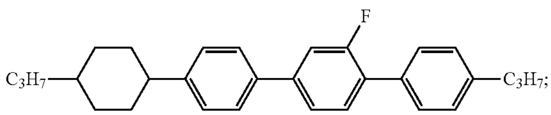
III-3-3-7
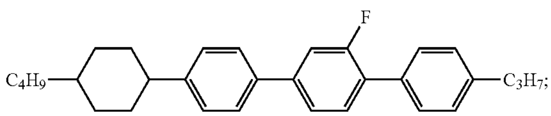
III-3-3-8
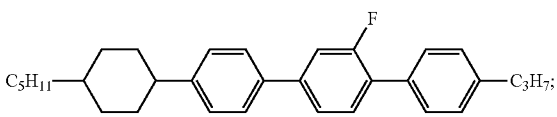
III-3-3-9
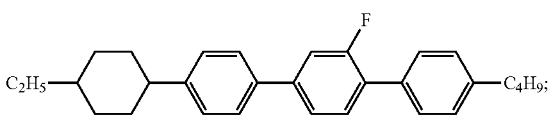
III-3-3-10
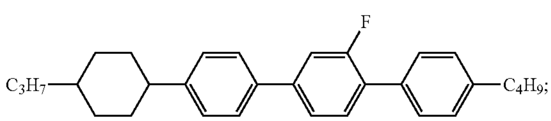
III-3-3-11
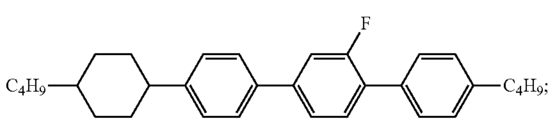
III-3-3-12
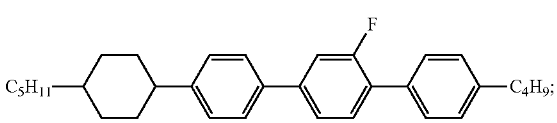
III-3-3-13
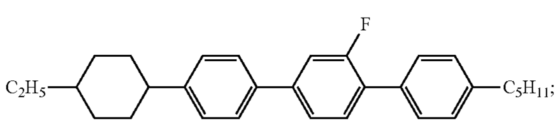
III-3-3-14
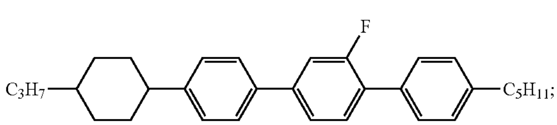
-continued
III-3-3-15
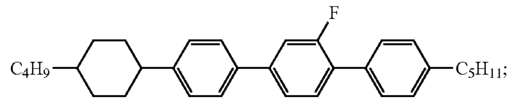
and
III-3-3-16
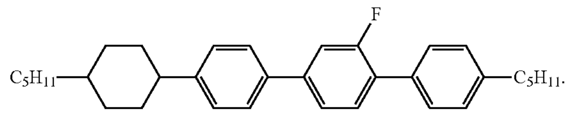
In some embodiments of the present invention, the compound of general formula III-3-4 is selected from a group consisting of the following compounds:
III-3-4-1
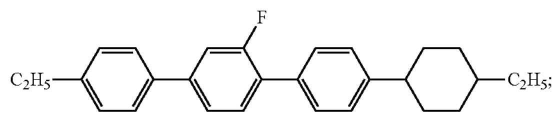
III-3-4-2
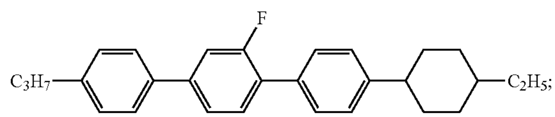
III-3-4-3
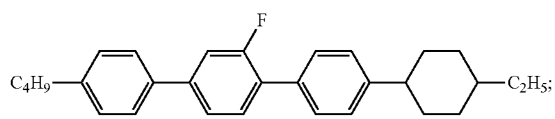
III-3-4-4
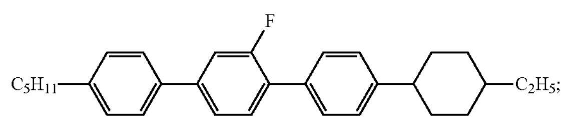
III-3-4-5
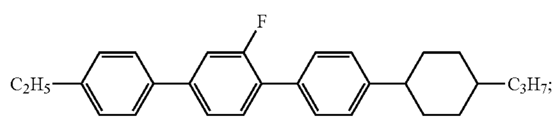
III-3-4-6
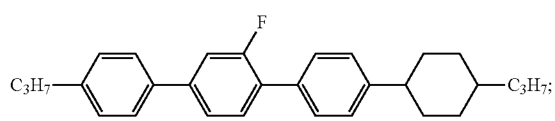
III-3-4-7
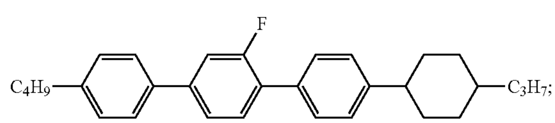
III-3-4-8
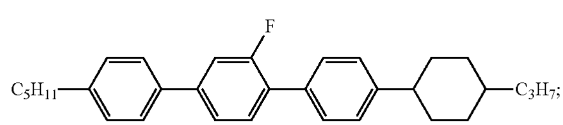

-continued

III-3-4-9

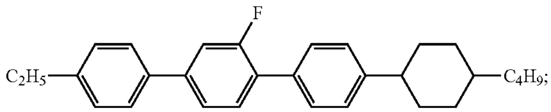

III-3-4-10

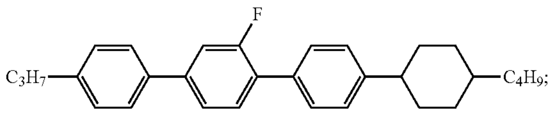

III-3-4-11

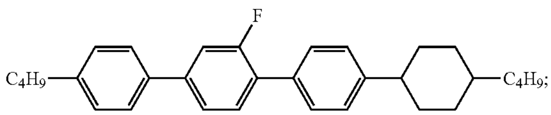

III-3-4-12

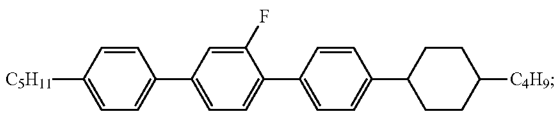

III-3-4-13

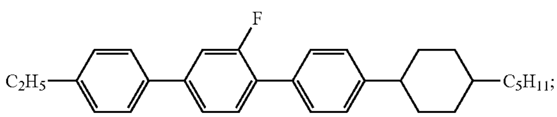

III-3-4-14

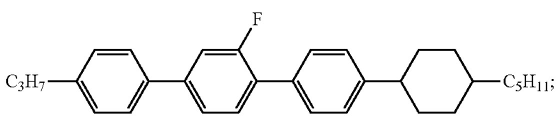

III-3-4-15

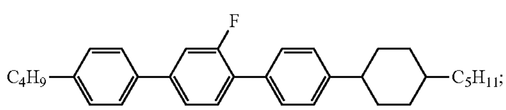

and

III-3-4-16

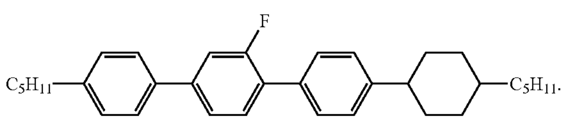

In some embodiments of the present invention, the compound of general formula III-3-5 is selected from a group consisting of the following compounds:

III-3-5-1

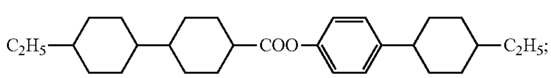

III-3-5-2

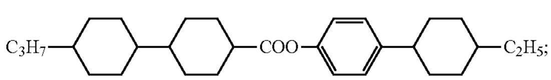

III-3-5-3

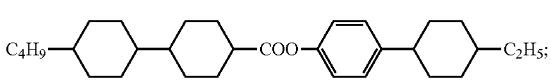

-continued

III-3-5-4

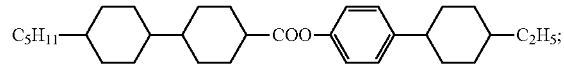

III-3-5-5

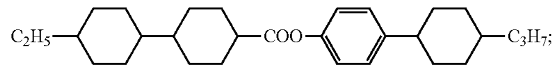

III-3-5-6

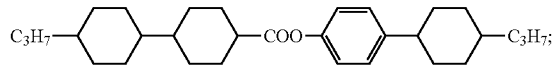

III-3-5-7

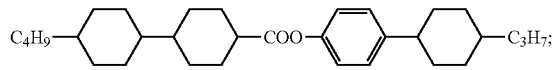

III-3-5-8

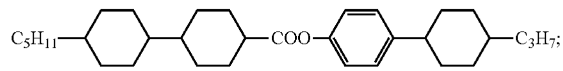

III-3-5-9

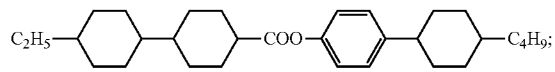

III-3-5-10

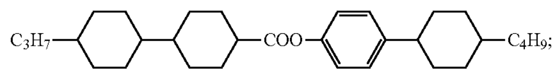

III-3-5-11

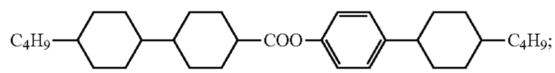

III-3-5-12

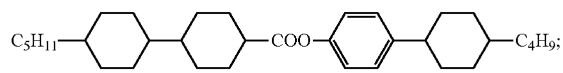

III-3-5-13

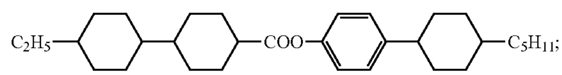

III-3-5-14

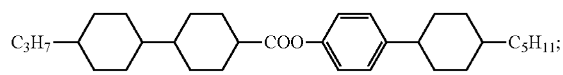

III-3-5-15

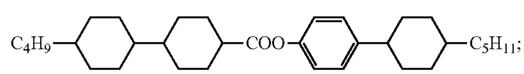

and

III-3-5-16

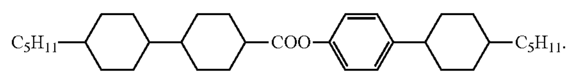

In some embodiments of the present invention, the compound of general formula I is preferably selected from a group consisting of the following compounds: I-1-1-11, I-1-1-3, I-1-1-10, I-1-1-2, I-1-1-4, I-1-1-1, I-1-1-5, I-1-1-9, I-1-1-6, I-1-1-7, I-2-2-9, I-2-2-10, I-2-2-6, I-2-2-11, I-2-2-7, I-2-1-9, I-2-1-10, I-2-1-2, I-2-1-6 and I-1-2-10.

In some embodiments of the present invention, the compound of general formula II is preferably selected from a group consisting of the following compounds: II-2, II-3, II-5, II-7, II-4, II-10, II-11, II-8 and 11-12.

In some embodiments of the present invention, the compound of general formula III is preferably selected from a group consisting of the following compounds: III-1-1-6, III-1-1-8, III-1-1-10, III-1-2-2, III-2-1-2, III-2-1-4, III-2-1-6, III-1-1-15, III-1-3-18, III-1-1-19, III-1-3-33, III-2-2-5, III-2-2-2, III-2-2-4, III-1-3-4, III-3-1-5, III-3-1-7, III-3-2-6 and III-2-2-7.

In another aspect, the present invention provides a liquid crystal composition which also comprises one or more additives known to those skilled in the art and described in the literatures. For example, polychromatic dye and/or chiral dopant which provides 0-15% of the total weight of the liquid crystal composition can be added.

Dopants which can be preferably added to the composition according to the present invention are shown below.

C 15

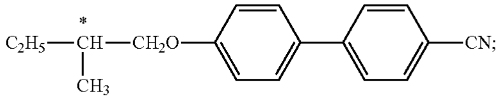

CB 15

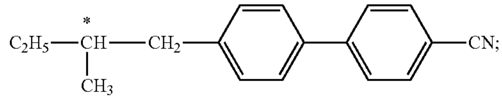

CM 21

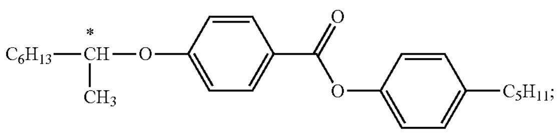

R/S-811

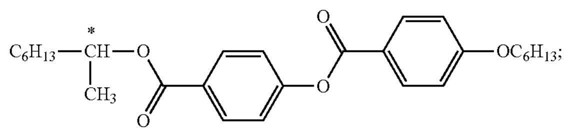

CM 44

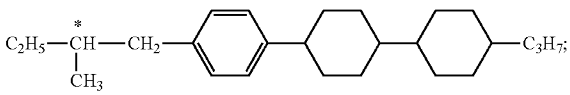

CM 45

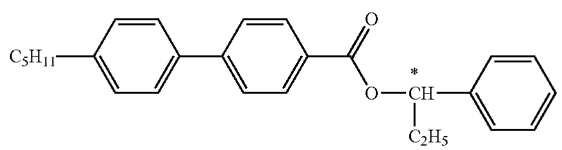

CM 47

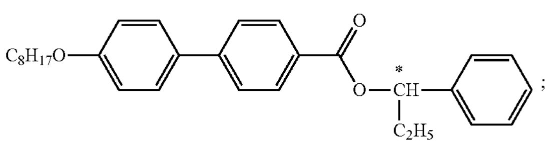

CN

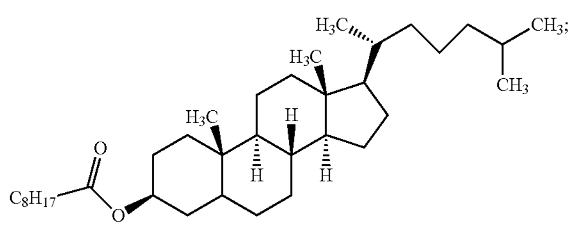

R/S-1011

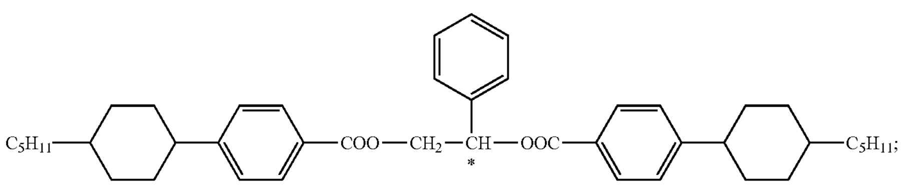

R/S-2011

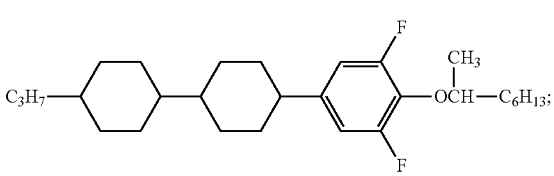

R/S-3011

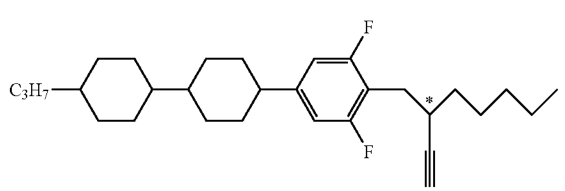

R/S-4011

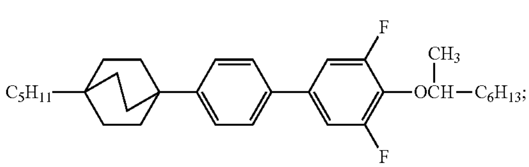

and

R/S-5011

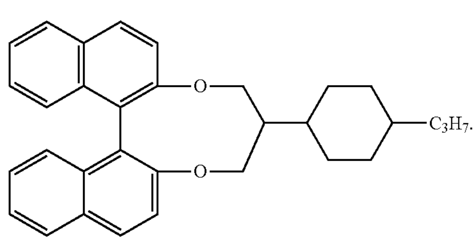

In some embodiments of the present invention, preferably, the dopant provides 0-5% of the total weight of the liquid crystal composition; more preferably, the dopant provides 0-1% of the total weight of the liquid crystal composition.
Stabilizers which can be added, for example, to the composition according to the present invention are mentioned below.
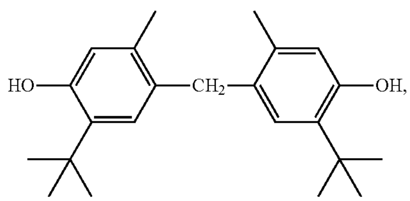
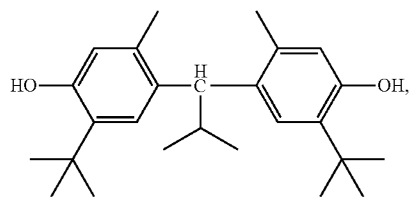
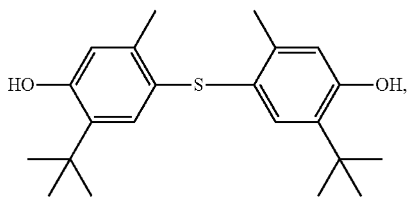
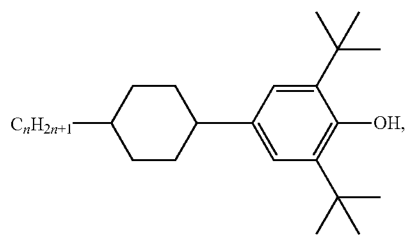
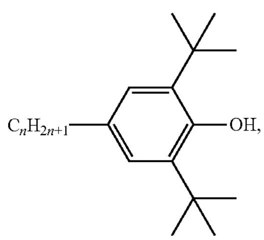
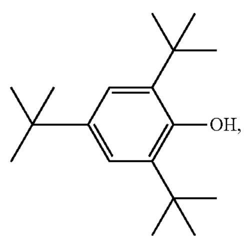
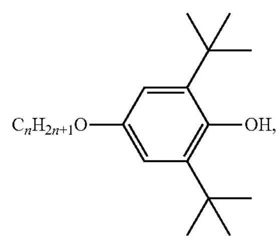
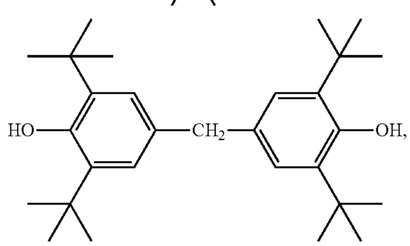
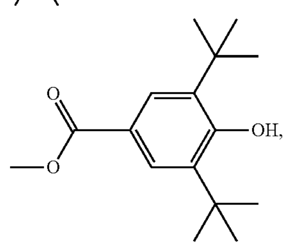
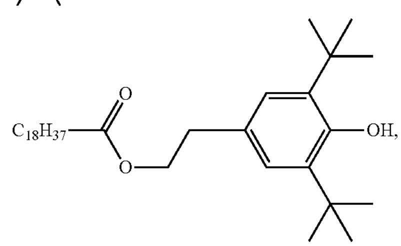
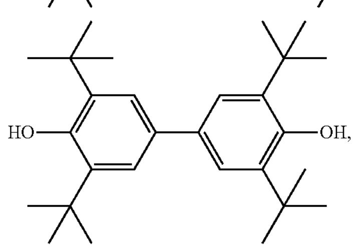
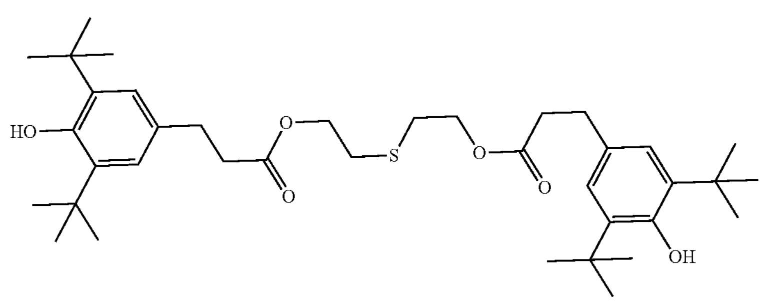
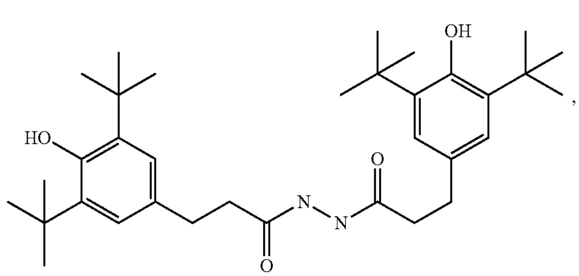

-continued
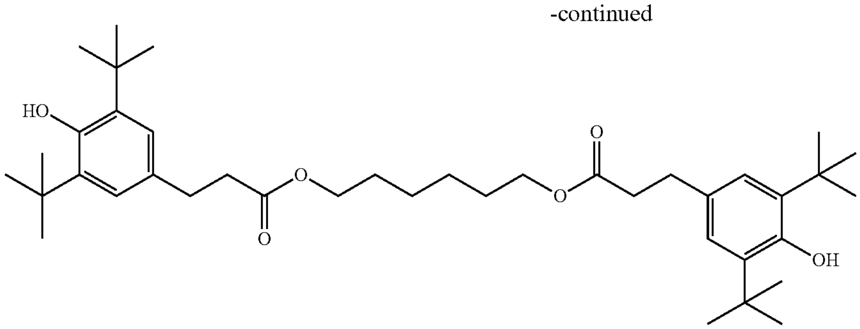
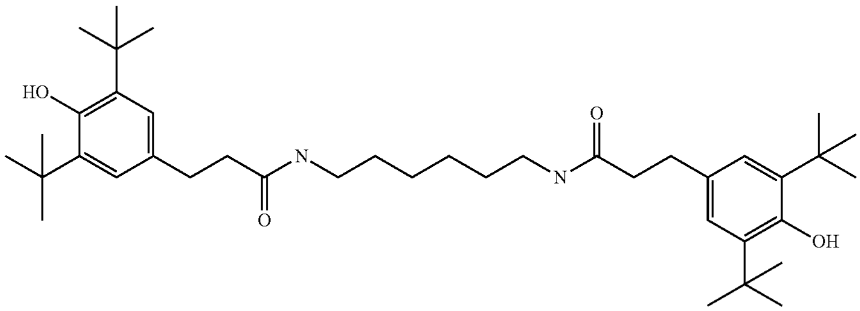
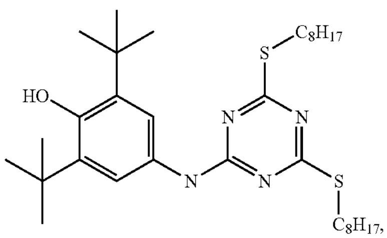
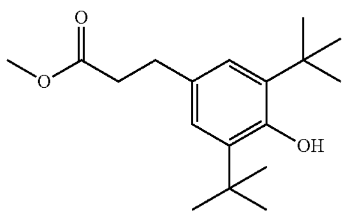
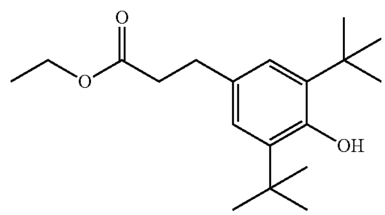
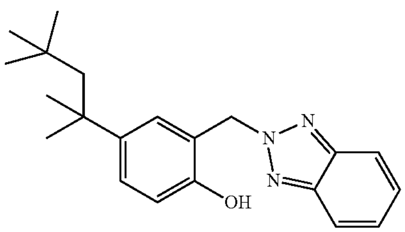
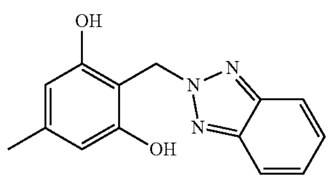
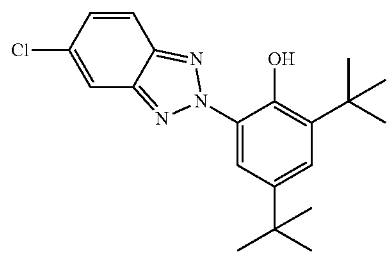
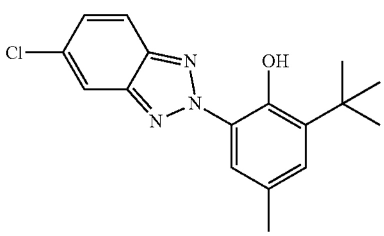
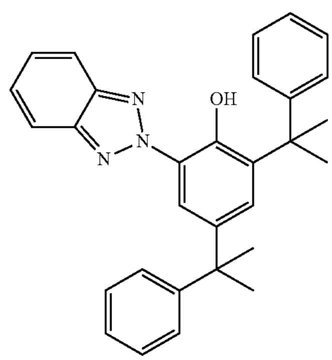
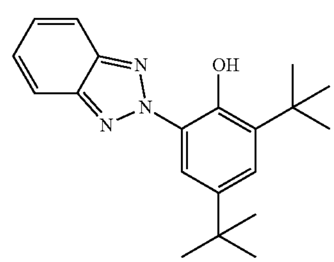
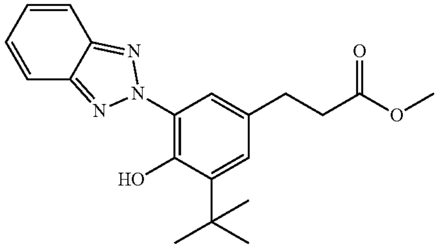
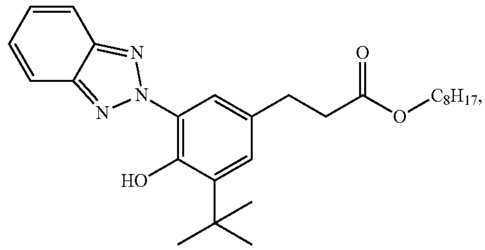

-continued
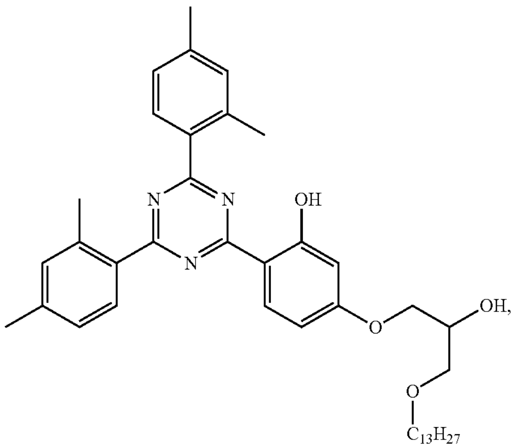
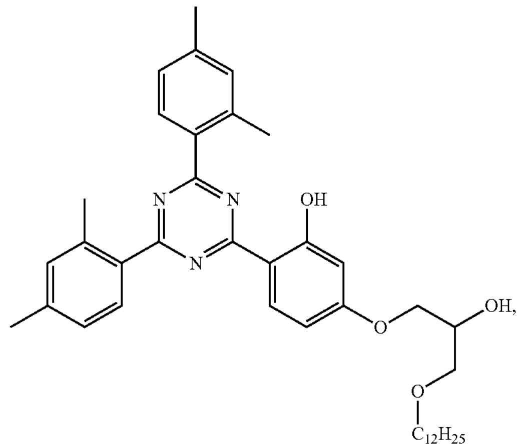
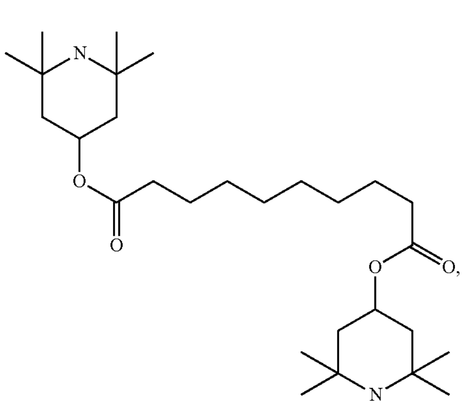
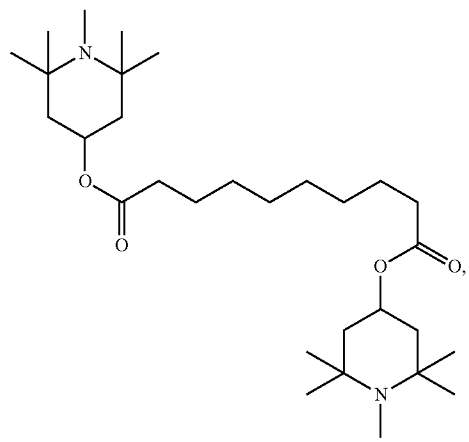
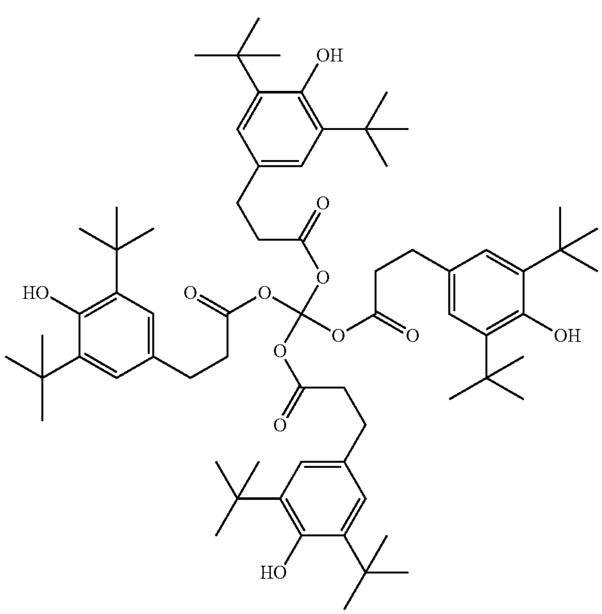
, and
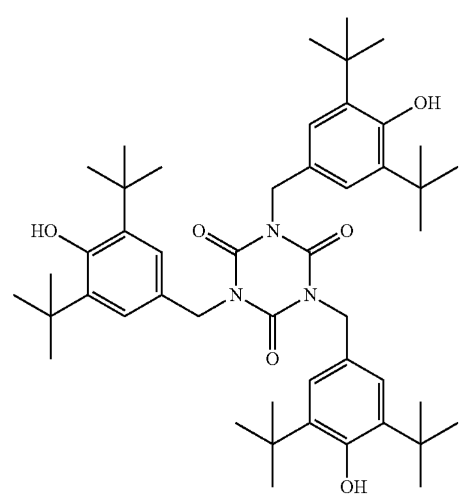
.

Preferably, the stabilizer is selected from stabilizers as shown below:

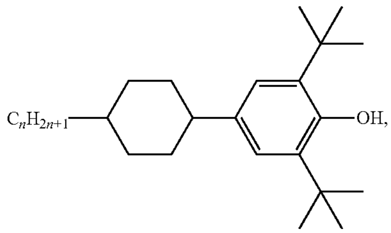

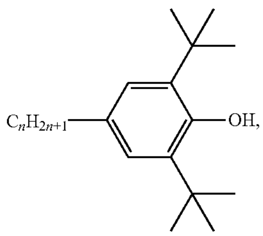

and

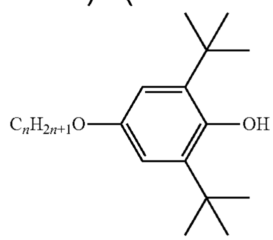

in which, n is a positive integer of 1-20.

In some embodiments of the present invention, preferably, the stabilizer provides 0-5% of the total weight of the liquid crystal composition; more preferably, the stabilizer provides 0-1% of the total weight of the liquid crystal composition; as a particularly preferred embodiment, the stabilizer provides 0-0.1% of the total weight of the liquid crystal composition.

In still another aspect, the present invention further provides a liquid crystal display device comprising the above liquid crystal composition.

When the compound of general formula I in the present invention has a group of $—OR_1'OR_2'$ and/or the compound of general formula II has a group of $—OR_3'OR_4'$, the liquid crystal composition comprising the compound of general formula I or the compound of general formula II has a lower viscosity, a faster response speed and a higher clearing point, particularly a larger optical anisotropy and a higher contrast, such that the liquid crystal display device comprising the liquid crystal composition exhibits a good display effect.

As compared to the prior art, the liquid crystal composition provided by the present invention has a higher optical anisotropy, the relatively large elastic constants $K_{11}$ and $K_{33}$ while maintaining a relatively high clearing point, an appropriate dielectric anisotropy and a better low-temperature intersolubility. The liquid crystal display device comprising the liquid crystal composition of the present invention can have advantages of a fast response, a high contrast and a wide temperature range, thereby having a good display effect and a large range of applicability.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compositions in the following Examples are represented by the codes listed in Table 2:

TABLE 2

Codes of the group structures of liquid crystal compounds

| Unit structure of group | Code | Name of group |
|---|---|---|
| 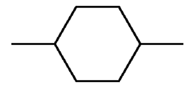 | C | 1,4-cyclohexylidene |
| 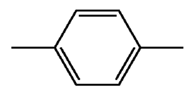 | P | 1,4-phenylene |
| 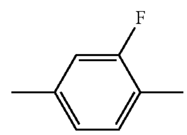 | G | 2-fluoro-1,4-phenylene |
| 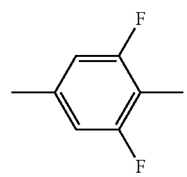 | U | 2,5-difluoro-1,4-phenylene |
| 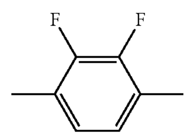 | W | 2,3-difluoro-1,4-phenylene |
| 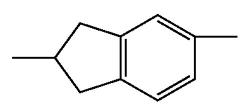 | I | indan-2,5-diyl |
| $—CH_2CH_2—$ | 2 | ethyl bridge bond |
| $—OCF_3$ | OCF3 | trifluoromethoxy |
| —F | F | fluorine substituent |
| —O— | O | oxygen substituent |
| $—CF_2O—$ | Q | difluoro ether group |
| —COO— | E | ester bridge bond |
| $—C_nH_{2n+1}$ or $—C_mH_{2m+1}$ | n or m | alkyl |
| —CH═CH— or —CH═$CH_2$ | V | alkenyl |
| —C≡C— | T | acetenyl |

Take a compound with the following structural formula as an example:

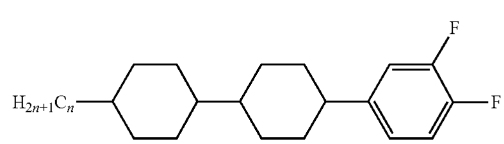

Represented by the codes listed in Table 2, this structural formula can be expressed as nCCGF, in which, n in the code represents the number of the carbon atoms of the alkyl on the left, for example, n is "3", meaning that the alkyl is $—C_3H_7$; C in the code represents cyclohexyl, G represents 2-fluoro-1,4-phenylene, and F represents fluoro.

The abbreviated codes of the test items in the following Examples are as follows:

Cp (° C.) clearing point (nematic-isotropy phases transition temperature)

Δn optical anisotropy (589 nm, 25° C.)

Δε dielectric anisotropy (1 KHz, 25° C.)

V10 threshold voltage (characteristic voltage with 10% relative contrast in normally white mode)

$K_{11}$ splay elastic constant $K_{33}$ bend elastic constant $t_{-40° C.}$ storage time at low temperature (at −40° C.)

In which, the optical anisotropy is tested using abbe refractometer under sodium lamp (589 nm) light source at 25° C.;

Δε=ε||−ε⊥, in which, ε|| is a dielectric constant parallel to the molecular axis, $\varepsilon_\perp$ is a dielectric constant perpendicular to the molecular axis, with the test conditions: 25° C., 1 KHz, TN90 type test cell with a cell gap of 7 μm.

$K_{11}$, $K_{33}$ are calculated by C-V curve of liquid crystal tested by LCR meter and anti-parallel rubbing cell; test conditions: 7 μm anti-parallel rubbing cell, V=0.1~20 V.

The components used in the following Examples can either be synthesized by method known in the art or be obtained commercially. The synthetic techniques are conventional, and each of the obtained liquid crystal compounds is tested to meet the standards of electronic compound.

The liquid crystal compositions are prepared in accordance with the ratios specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so forth.

The liquid crystal compositions specified in the following Examples are prepared and studied. The components and test results for the performances of each liquid crystal composition are shown below.

COMPARATIVE EXAMPLE 1

The liquid crystal composition of Comparative Example 1 is prepared according to each compound and weight percentage listed in Table 3 and then tested for performance by filling the same between two substrates of a liquid crystal display device. The test data is shown in the Table below:

TABLE 3

Formulation of the liquid crystal composition and its test performances

| Code of component | Weight percentage | Test results for the performance parameters | |
|---|---|---|---|
| 3CWO2 | 10 | Δn | 0.095 |
| 5CWO2 | 10 | Cp | 76 |
| 2CPWO2 | 8 | Δε | −3.1 |
| 3CPWO2 | 8 | V10 | 2.38 |
| 3CWO4 | 8 | $K_{11}$ | 12.6 |
| 3CCWO2 | 5 | $K_{33}$ | 11.5 |
| 5CCWO2 | 5 | $t_{-40° C.}$ | 5 days |
| 4CCWO2 | 4 | | |
| 3CPP2 | 6 | | |
| 3CCV | 29 | | |
| 3CCV1 | 5 | | |
| 3PGPC2 | 2 | | |
| Total | 100 | | |

Example 1

The liquid crystal composition of Example 1 is prepared according to each compound and weight percentage listed in Table 4 and then tested for performance by filling the same between two substrates of a liquid crystal display device. The test data is shown in the Table below:

TABLE 4

Formulation of the liquid crystal composition and its test performances

| Code of component | Weight percentage | Test results for the performance parameters | |
|---|---|---|---|
| 3CCP1 | 5 | Δn | 0.105 |
| 3CCV | 26.5 | Cp | 90 |
| 3CCV1 | 9 | Δε | −3.7 |
| 3CWO2 | 8 | V10 | 2.4 |
| 3CCWO2 | 9 | $K_{11}$ | 15.1 |
| 5CCWO2 | 9 | $K_{33}$ | 18.3 |
| 2CCWO2 | 6 | $t_{-40° C.}$ | 12 days |
| 2OWWO4O1 | 3 | | |
| 3OWWO4O1 | 3 | | |
| 4PPWO4 | 1.5 | | |
| 4PPWO2 | 1.5 | | |
| 3PPWO4 | 1.5 | | |
| 3PPWO2 | 1.5 | | |
| 5PPWO2 | 1.5 | | |
| 2PWWO4O1 | 2.5 | | |
| 3PWWO4O1 | 3 | | |
| 3PWWO3O1 | 3 | | |
| 4PWWO4O1 | 3 | | |
| 4PWWO3O1 | 2.5 | | |
| Total | 100 | | |

Example 2

The liquid crystal composition of Example 2 is prepared according to each compound and weight percentage listed in Table 5 and then tested for performance by filling the same between two substrates of a liquid crystal display device. The test data is shown in the Table below:

TABLE 5

Formulation of the liquid crystal composition and its test performances

| Code of component | Weight percentage | Test results for the performance parameters | |
|---|---|---|---|
| 3CPP2 | 3 | Δn | 0.101 |
| 3CPP1 | 2 | Cp | 75 |
| 3CCP1 | 3 | Δε | −4.6 |
| 3CCV | 27 | V10 | 1.95 |
| 5CWO2 | 7 | $K_{11}$ | 15.5 |
| 3CWO4 | 6 | $K_{33}$ | 17.8 |
| 3CCWO2 | 11 | $t_{-40° C.}$ | 13 days |
| 4CCWO2 | 6 | | |
| 2CCWO2 | 9 | | |
| 2CCWO4O1 | 8 | | |
| 2CPWO3O1 | 8 | | |
| 3PPWO2 | 2 | | |
| 2PWWO4 | 2 | | |
| 3PWWO4 | 2 | | |
| 3PWWO2 | 2 | | |
| 2PWWO4O1 | 2 | | |
| Total | 100 | | |

Example 3

The liquid crystal composition of Example 3 is prepared according to each compound and weight percentage listed in Table 6 and then tested for performance by filling the same between two substrates of a liquid crystal display device. The test data is shown in the Table below:

TABLE 6

| Formulation of the liquid crystal composition and its test performances | | | |
|---|---|---|---|
| Code of component | Weight percentage | Test results for the performance parameters | |
| 3CCP1 | 5 | Δn | 0.109 |
| 3CPP2 | 3 | Cp | 78.5 |
| 3CCV | 34 | Δε | −3.3 |
| 5PP1 | 3 | V10 | 2.2 |
| 2OWWO4O1 | 6 | $K_{11}$ | 15.1 |
| 3OWWO4O1 | 6 | $K_{33}$ | 18.3 |
| 3CCWO2 | 10 | $t_{-40^\circ C.}$ | 11 days |
| 5CCWO2 | 3 | | |
| 4CCWO2 | 8 | | |
| 4PWPO4O1 | 7 | | |
| 2PWWO4O1 | 7 | | |
| 3PWWO4O1 | 8 | | |
| Total | 100 | | |

Example 6

The liquid crystal composition of Example 4 is prepared according to each compound and weight percentage listed in Table 7 and then tested for performance by filling the same between two substrates of a liquid crystal display device. The test data is shown in the Table below:

TABLE 7

| Formulation of the liquid crystal composition and its test performances | | | |
|---|---|---|---|
| Code of component | Weight percentage | Test results for the performance parameters | |
| 3CCV | 32 | Δn | 0.108 |
| 3CCV1 | 8 | Cp | 78.6 |
| 3CPP2 | 7 | Δε | −3.3 |
| 3CWO2 | 2 | V10 | 2.13 |
| 2CWO4O1 | 6 | $K_{11}$ | 15.8 |
| 3CCWO2 | 5 | $K_{33}$ | 18.6 |
| 5CCWO2 | 5 | $t_{-40^\circ C.}$ | 10 days |
| 2CPWO2 | 5 | | |
| 4CPWO4O1 | 2 | | |
| 3CCWO4O1 | 6 | | |
| 3CC1OWO1 | 3 | | |
| 3CC1OWO4O1 | 4 | | |
| 4PWPO4O1 | 3 | | |
| 2PWWO4O1 | 6 | | |
| 3PWWO4O1 | 6 | | |
| Total | 100 | | |

Example 5

The liquid crystal composition of Example 5 is prepared according to each compound and weight percentage listed in Table 8 and then tested for performance by filling the same between two substrates of a liquid crystal display device. The test data is shown in the Table below:

TABLE 8

| Formulation of the liquid crystal composition and its test performances | | | |
|---|---|---|---|
| Code of component | Weight percentage | Test results for the performance parameters | |
| 3CPP2 | 5 | Δn | 0.103 |
| 3CPPC3 | 2 | Cp | 85.8 |
| 3CCP1 | 8 | Δε | −3.1 |
| 3CCV | 28 | V10 | 2.16 |
| 3CCV1 | 12 | $K_{11}$ | 15.9 |
| 3CPWO2 | 5 | $K_{33}$ | 17.5 |
| 3CCWO2 | 3 | $t_{-40^\circ C.}$ | 13 days |
| 2CPWO1 | 4 | | |
| 2OWWO4O1 | 6 | | |
| 3CWO4O1 | 6 | | |
| 4CPWO4O1 | 4 | | |
| 2CC1OWO4O1 | 3 | | |
| 3CC1OWO4O1 | 3 | | |
| 4CC1OWO4O1 | 3 | | |
| 4PWWO4O1 | 4 | | |
| 4PWWO3O1 | 4 | | |
| Total | 100 | | |

Example 6

The liquid crystal composition of Example 6 is prepared according to each compound and weight percentage listed in Table 9 and then tested for performance by filling the same between two substrates of a liquid crystal display device. The test data is shown in the Table below:

TABLE 9

| Formulation of the liquid crystal composition and its test performances | | | |
|---|---|---|---|
| Code of component | Weight percentage | Test results for the performance parameters | |
| 3CPP2 | 7 | Δn | 0.11 |
| 2CPP3 | 3 | Cp | 88 |
| 3CCV | 32 | Δε | −2.9 |
| 3CWO2 | 9 | V10 | 2.46 |
| 5CWO2 | 4 | $K_{11}$ | 15.9 |
| 3CCWO2 | 10 | $K_{33}$ | 17.2 |
| 5CCWO3O1 | 5 | $t_{-40^\circ C.}$ | 14 days |
| 4CCWO4O1 | 6 | | |
| 3CCWO3O1 | 3 | | |
| 2PWPO4O1 | 3 | | |
| 3CWPO4O1 | 3 | | |
| 4PWPO3O1 | 3 | | |
| 3PWWO4 | 2 | | |
| 3PWWO2 | 2 | | |
| 3PWWO3 | 4 | | |
| 3PPWO4 | 4 | | |
| Total | 100 | | |

Example 7

The liquid crystal composition of Example 7 is prepared according to each compound and weight percentage listed in Table 10 and then tested for performance by filling the same between two substrates of a liquid crystal display device. The test data is shown in the Table below:

TABLE 10

| Formulation of the liquid crystal composition and its test performances | | | |
|---|---|---|---|
| Code of component | Weight percentage | Test results for the performance parameters | |
| 3CCV | 39 | Δn | 0.110 |
| 3CCV1 | 2.5 | Cp | 90 |
| 3CPP1 | 5.5 | Δε | −2.6 |
| 3CPP2 | 9 | V10 | 2.59 |
| 3CWO4 | 2 | $K_{11}$ | 16.1 |
| 5CWO4O2 | 6 | $K_{33}$ | 18.8 |
| 3CCWO1 | 5 | $t_{-40° C.}$ | 13 days |
| 4CCWO2 | 5.5 | | |
| 2CCWO3O1 | 3 | | |
| 3CCWO3O1 | 10 | | |
| 5CPWO4O2 | 3 | | |
| 3CPWO3O1 | 1 | | |
| 4CPWO3O1 | 1.5 | | |
| 3PPWO2 | 1 | | |
| 3PPWO4O1 | 3 | | |
| 3PWWO4O1 | 3 | | |
| Total | 100 | | |

Example 8

The liquid crystal composition of Example 8 is prepared according to each compound and weight percentage listed in Table 11 and then tested for performance by filling the same between two substrates of a liquid crystal display device. The test data is shown in the Table below:

TABLE 11

| Formulation of the liquid crystal composition and its test performances | | | |
|---|---|---|---|
| Code of component | Weight percentage | Test results for the performance parameters | |
| 3CCV | 35 | Δn | 0.108 |
| 3CPP2 | 7 | Cp | 85.4 |
| 3CCP1 | 3 | Δε | −2.5 |
| 3CWO2 | 19 | V10 | 2.44 |
| 5CWO2 | 4 | $K_{11}$ | 16.2 |
| 3CWO4O1 | 3 | $K_{33}$ | 18.6 |
| 3PWP3 | 3 | $t_{-40° C.}$ | 14 days |
| 3CCWO2 | 5 | | |
| 5CCWO2 | 5 | | |
| 4CCWO2 | 6 | | |
| 4CCWO4O1 | 2 | | |
| 5CCWO4O1 | 2 | | |
| 3CPWO3O1 | 2 | | |
| 3CPWO4O1 | 2 | | |
| 3PPWO3O1 | 2 | | |
| Total | 100 | | |

Example 9

The liquid crystal composition of Example 9 is prepared according to each compound and weight percentage listed in Table 12 and then tested for performance by filling the same between two substrates of a liquid crystal display device. The test data is shown in the Table below:

TABLE 12

| Formulation of the liquid crystal composition and its test performances | | | |
|---|---|---|---|
| Code of component | Weight percentage | Test results for the performance parameters | |
| 2CPWO2 | 6 | Δn | 0.105 |
| 3CPWO2 | 6 | Cp | 99 |
| 3CPWO4 | 5 | Δε | −5 |
| 3C1OWO2 | 5 | V10 | 2.1 |
| 3CPWO3 | 6 | $K_{11}$ | 15.8 |
| 2PWWO4O1 | 3 | $K_{33}$ | 18.5 |
| 3PWWO4O1 | 3 | $t_{-40° C.}$ | 8 days |
| 2CC1OWO2 | 5 | | |
| 3CC1OWO2 | 6 | | |
| 3PWO2 | 6 | | |
| 2PWP3 | 5 | | |
| 2PWP4 | 8 | | |
| 3CPP2 | 5 | | |
| 3CCV | 15 | | |
| VCCP1 | 10 | | |
| V2CCP1 | 5 | | |
| 3PPWO2 | 1 | | |
| Total | 100 | | |

Example 10

The liquid crystal composition of Example 10 is prepared according to each compound and weight percentage listed in Table 13 and then tested for performance by filling the same between two substrates of a liquid crystal display device. The test data is shown in the Table below:

TABLE 13

| Formulation of the liquid crystal composition and its test performances | | | |
|---|---|---|---|
| Code of component | Weight percentage | Test results for the performance parameters | |
| 3CWO2 | 9 | Δn | 0.109 |
| 2CPWO2 | 8 | Cp | 81 |
| 3CPWO2 | 8 | Δε | −3.9 |
| 3CPWO4 | 7 | V10 | 2.2 |
| 3CWO4 | 5.5 | $K_{11}$ | 13.7 |
| 3PWWO3O1 | 3 | $K_{33}$ | 15.2 |
| 4PWWO4O1 | 3 | $t_{-40° C.}$ | 18 days |
| 3CPWO3 | 8 | | |
| 3CCWO2 | 10.5 | | |
| 3CCV | 30 | | |
| 3PPWO4 | 2 | | |
| 2PPWO5 | 2 | | |
| 2PPWO3 | 2 | | |
| 1PP2V | 2 | | |
| Total | 100 | | |

Example 11

The liquid crystal composition of Example 11 is prepared according to each compound and weight percentage listed in Table 14 and then tested for performance by filling the same between two substrates of a liquid crystal display device. The test data is shown in the Table below:

TABLE 14

| Formulation of the liquid crystal composition and its test performances | | | |
|---|---|---|---|
| Code of component | Weight percentage | Test results for the performance parameters | |
| 3CWO2 | 13 | Δn | 0.105 |
| 2CPWO2 | 5 | Cp | 90 |
| 3CPWO2 | 5 | Δε | −3.1 |
| 3CWO4 | 6.5 | V10 | 2.3 |
| 3CPWO3 | 4 | $K_{11}$ | 14.2 |
| 4PWWO4O1 | 3 | $K_{33}$ | 15.9 |
| 4PWWO3O1 | 3 | $t_{-40° C.}$ | 8 days |
| 3CCWO2 | 8 | | |
| 3CCWO3 | 7.5 | | |
| 3CCV | 20 | | |
| 3CCV1 | 12 | | |
| 2PPWO4 | 3 | | |
| 2PPWO2 | 3 | | |
| 3PPWO3 | 3 | | |
| 1PP2V | 4 | | |
| Total | 100 | | |

Example 12

The liquid crystal composition of Example 12 is prepared according to each compound and weight percentage listed in Table 15 and then tested for performance by filling the same between two substrates of a liquid crystal display device. The test data is shown in the Table below:

TABLE 15

| Formulation of the liquid crystal composition and its test performances | | | |
|---|---|---|---|
| Code of component | Weight percentage | Test results for the performance parameters | |
| 3CPP2 | 7 | Δn | 0.1 |
| 3CPP1 | 2 | Cp | 75 |
| 3CWO2 | 13 | Δε | −2.5 |
| 2C1OWO2 | 4 | V10 | 2.5 |
| 3CWO4 | 6 | $K_{11}$ | 13.8 |
| 3CCWO2 | 7 | $K_{33}$ | 15.6 |
| 3CCWO3 | 6 | $t_{-40° C.}$ | 10 days |
| 2CCWO4O1 | 3 | | |
| 2CPWO3O1 | 3 | | |
| 2OWWO4O1 | 2 | | |
| 4CC1OWO2 | 1.5 | | |
| 3CCV | 24.5 | | |
| 3CCV1 | 9 | | |
| 3PPWO5 | 4 | | |
| 4PPWO2 | 4 | | |
| 4PPWO3 | 4 | | |
| Total | 100 | | |

Example 13

The liquid crystal composition of Example 13 is prepared according to each compound and weight percentage listed in Table 16 and then tested for performance by filling the same between two substrates of a liquid crystal display device. The test data is shown in the Table below:

TABLE 16

| Formulation of the liquid crystal composition and its test performances | | | |
|---|---|---|---|
| Code of component | Weight percentage | Test results for the performance parameters | |
| 3CPP2 | 9.5 | Δn | 0.115 |
| 2CPP3 | 5 | Cp | 94 |
| 3C1OWO2 | 11 | Δε | −2.9 |
| 2CC1OWO2 | 5 | V10 | 2.6 |
| 3CC1OWO2 | 5 | $K_{11}$ | 15.1 |
| 4CC1OWO2 | 6 | $K_{33}$ | 17.8 |
| 3CCV | 17 | $t_{-40° C.}$ | 14 days |
| 3CCV1 | 12 | | |
| 2C1OWO2 | 4 | | |
| 4C1OWO2 | 4 | | |
| 4PPWO4 | 2 | | |
| 4PPWO5 | 2 | | |
| 4PWPO4O1 | 4 | | |
| 2PWWO4O1 | 4 | | |
| V2PTP2V | 5 | | |
| 3CCP1 | 4.5 | | |
| Total | 100 | | |

Example 14

The liquid crystal composition of Example 14 is prepared according to each compound and weight percentage listed in Table 17 and then tested for performance by filling the same between two substrates of a liquid crystal display device. The test data is shown in the Table below:

Table 17 Formulation of the liquid crystal composition and its test performances

TABLE 17

| Formulation of the liquid crystal composition and its test performances | | | |
|---|---|---|---|
| Code of component | Weight percentage | Test results for the performance parameters | |
| 3CPP2 | 8 | Δn | 0.109 |
| 3C1OWO2 | 8 | Cp | 85 |
| 2CC1OWO2 | 7 | Δε | −4.5 |
| 3CC1OWO2 | 8.5 | V10 | 2.1 |
| 4CC1OWO2 | 9 | $K_{11}$ | 14.1 |
| 3PPO2 | 5 | $K_{33}$ | 15.5 |
| 3CCV | 12 | $t_{-40° C.}$ | 10 days |
| 3CCV1 | 12 | | |
| 2C1OWO2 | 6.5 | | |
| 4C1OWO2 | 6.5 | | |
| 3PPWO4 | 2 | | |
| 3PPWO2 | 2 | | |
| 3CC1OWO4O1 | 4 | | |
| 4PWPO4O1 | 3 | | |
| 2PWWO4O1 | 3 | | |
| 3CCP1 | 3.5 | | |
| Total | 100 | | |

Example 15

The liquid crystal composition of Example 15 is prepared according to each compound and weight percentage listed in Table 18 and then tested for performance by filling the same between two substrates of a liquid crystal display device. The test data is shown in the Table below:

TABLE 18

Formulation of the liquid crystal composition and its test performances

| Code of component | Weight percentage | Test results for the performance parameters | |
|---|---|---|---|
| 3CPPC3 | 3 | Δn | 0.095 |
| 5CPPC3 | 3 | Cp | 105 |
| 3CGPC3 | 3 | Δε | −2.1 |
| 3C1OWO2 | 2 | V10 | 2.8 |
| 2CC1OWO2 | 6 | $K_{11}$ | 16.3 |
| 3CC1OWO2 | 6 | $K_{33}$ | 18.5 |
| 4CC1OWO2 | 5 | $t_{-40^\circ C.}$ | 16 days |
| 3PPO2 | 3 | | |
| 3CPO2 | 2 | | |
| 3CCV | 31 | | |
| 3CCV1 | 12 | | |
| 3CWO4O1 | 5 | | |
| 4CPWO4O1 | 6 | | |
| 2CC1OWO4O1 | 4 | | |
| 2C1OWO2 | 2 | | |
| 4C1OWO2 | 2 | | |
| 3PPWO4 | 2 | | |
| 3PPWO2 | 2 | | |
| 4PPWO2 | 1 | | |
| Total | 100 | | |

Example 16

The liquid crystal composition of Example 16 is prepared according to each compound and weight percentage listed in Table 19 and then tested for performance by filling the same between two substrates of a liquid crystal display device. The test data is shown in the Table below:

TABLE 19

Formulation of the liquid crystal composition and its test performances

| Code of component | Weight percentage | Test results for the performance parameters | |
|---|---|---|---|
| 3CPP2 | 4 | Δn | 0.106 |
| 2CPP2 | 4 | Cp | 83 |
| 5PP1 | 4 | Δε | −1.5 |
| 3PWO2 | 8 | V10 | 3.1 |
| 3CWO2 | 6 | $K_{11}$ | 16.5 |
| 5CWO2 | 5 | $K_{33}$ | 18.6 |
| 3CWO4 | 5 | $t_{-40^\circ C.}$ | 13 days |
| 5CWO4 | 2 | | |
| 3CGP2 | 6 | | |
| 3CCWO2 | 3 | | |
| 5CCWO2 | 3 | | |
| 2CCWO2 | 1 | | |
| 3CC1OWO4O1 | 3 | | |
| 4CC1OWO4O1 | 3 | | |
| 4PWWO4O1 | 4 | | |
| 4PWWO3O1 | 4 | | |
| 3CCV | 25 | | |
| 3CCV1 | 6 | | |
| 3PPWO4 | 2 | | |
| 3PPWO2 | 2 | | |
| Total | 100 | | |

Example 17

The liquid crystal composition of Example 17 is prepared according to each compound and weight percentage listed in Table 20 and then tested for performance by filling the same between two substrates of a liquid crystal display device. The test data is shown in the Table below:

TABLE 20

Formulation of the liquid crystal composition and its test performances

| Code of component | Weight percentage | Test results for the performance parameters | |
|---|---|---|---|
| 3CPP2 | 5 | Δn | 0.09 |
| 2CPP3 | 5 | Cp | 88 |
| 3C1OWO2 | 6 | Δε | −3.1 |
| 2CC1OWO2 | 6 | V10 | 2.3 |
| 3CC1OWO2 | 6 | $K_{11}$ | 14.5 |
| 3CC2 | 18 | $K_{33}$ | 16.6 |
| 5CC2 | 6 | $t_{-40^\circ C.}$ | 13 days |
| 4CC3 | 7 | | |
| 4CC1OWO2 | 5 | | |
| 2PWPO4O1 | 3 | | |
| 3CWPO4O1 | 3 | | |
| 4PWPO3O1 | 3 | | |
| 3PWWO4 | 3 | | |
| 3PWWO2 | 4 | | |
| 3PPO2 | 1 | | |
| 3CCV1 | 9 | | |
| 4C1OWO2 | 3 | | |
| 3PPWO4 | 2 | | |
| 3PPWO2 | 3 | | |
| 4PPWO2 | 2 | | |
| Total | 100 | | |

As can be seen from Comparative Example 1 and Examples 1-17, the liquid crystal composition of the present invention has a higher optical anisotropy, a higher clearing point, an appropriate dielectric anisotropy, a better low-temperature intersolubility and the relatively large elastic constants Ku and $K_{33}$, such that the liquid crystal display device comprising the liquid crystal composition of the present invention can have advantages of a fast response, a high contrast and a wide temperature range, thereby having a good display effect and a large range of applicability.

INDUSTRIAL APPLICABILITY

The liquid crystal compositions related in the present invention can be applied to the field of liquid crystal.

The invention claimed is:

1. A liquid crystal composition comprising:

at least one compound of general formula I

I

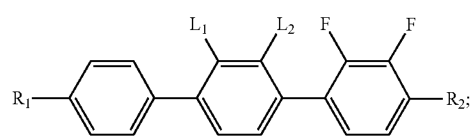

at least one compound of general formula II

II

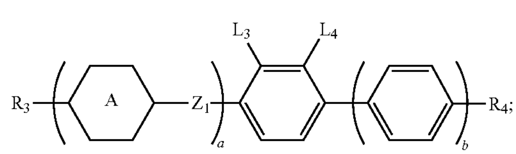

and at least one compound of general formula III

III

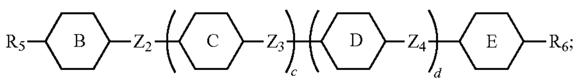

in which:

$R_1$ and $R_2$ each independently represents —H, —F, $C_{1-12}$ linear alkyl or alkoxy, $C_{2-12}$ alkenyl or alkenoxy, or —$OR^{1}{}'OR_2{}'$, wherein one or more H of the alkyl or alkoxy and the alkenyl or alkenoxy can be substituted by F, wherein $R_1{}'$ represents $C_{3-12}$ alkylene or $C_{3-12}$ alkenylene, $R_2{}'$ represents linear $C_{1-12}$ alkyl or $C_{2-12}$ alkenyl;

$R_3$ and $R_4$ each independently represents —H, —F, $C_{1-12}$ linear alkyl or alkoxy, $C_{2-12}$ alkenyl or alkenoxy, or —$OR^{3}{}'OR_4{}'$, wherein one or more H of the alkyl or alkoxy and the alkenyl or alkenoxy can be substituted by F, wherein $R_3{}'$ represents $C_{3-12}$ alkylene or $C_{3-12}$ alkenylene, $R_4{}'$ represents linear $C_{1-12}$ alkyl or $C_{2-12}$ alkenyl;

$R_5$ and $R_6$ each independently represents —H, —F, $C_{1-12}$ linear alkyl or alkoxy, $C_{3-6}$ cycloalkyl, or $C_{2-12}$ alkenyl or alkenoxy;

$Z_1$ represents single bond;

$Z_2$, $Z_3$ and $Z_4$ each independently represents single bond, —COO—, —OCO—, —$CH_2O$—, —$OCH_2$— or —$CH_2CH_2$—;

$L_1$ and $L_2$ each independently represents —H, —F, —Cl, —CN or —NCS;

$L_3$ and $L_4$ each independently represents —F, —Cl, —CN or —NCS;

ring

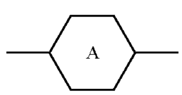

represents

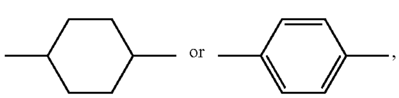

wherein one or more —$CH_2$— in

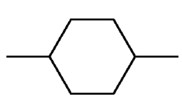

can be replaced by —O—, one or more H on

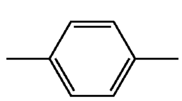

can be substituted by halogen;

ring

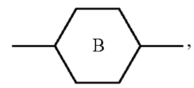

ring

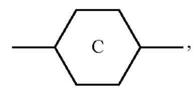

ring

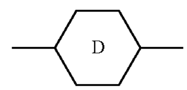

and ring

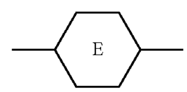

each independently represents

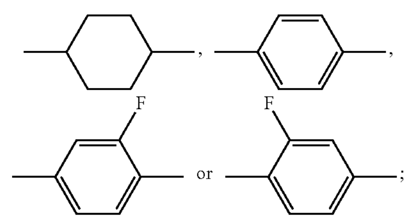

a represents 0, 1, 2 or 3, when a is 2 or 3, ring

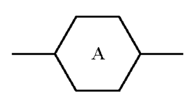

can be same or different, with at least one ring

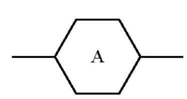

represents

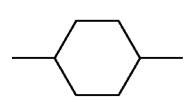

b, c, and d each independently represents 0 or 1;

wherein at least one of $R_1$ or $R_2$ is —$OR_1{}'OR_2{}'$ or at least one of $R_3$ or $R_4$ is —$OR_3{}'OR_4{}'$.

2. The liquid crystal composition according to claim 1, wherein the compound of general formula I is selected from a group consisting of the following compounds:

I-1

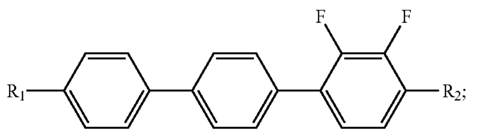

and

I-2

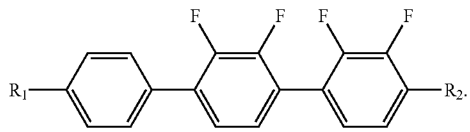

3. The liquid crystal composition according to claim 2, wherein the compound of general formula I-1 is selected from a group consisting of the following compounds:

I-1-1

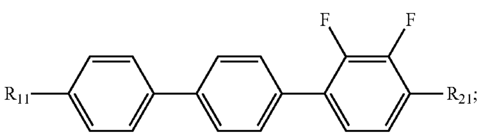

I-1-2

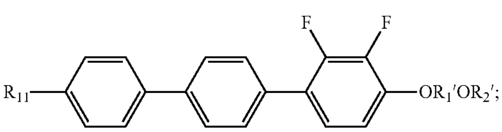

and

I-1-3

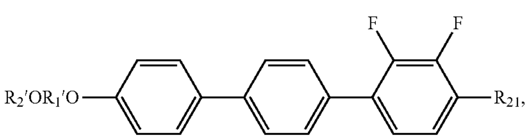

in which, $R_{11}$ and $R_{21}$ each independently represents $C_{1-10}$ linear alkyl or alkoxy, or $C_{2-10}$ alkenyl or alkenoxy, wherein one or more H of the alkyl or alkoxy and the alkenyl or alkenoxy can be substituted by F;

$R_1$' represents $C_{3-10}$ alkylene or $C_{3-10}$ alkenylene, $R_2$' represents linear $C_{1-10}$ alkyl or $C_{2-10}$ alkenyl.

4. The liquid crystal composition according to claim 2, wherein the compound of general formula I-2 is selected from a group consisting of the following compounds:

I-2-1

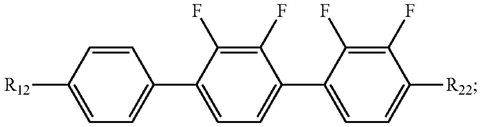

I-2-2

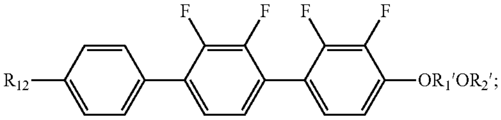

and

-continued

I-2-3

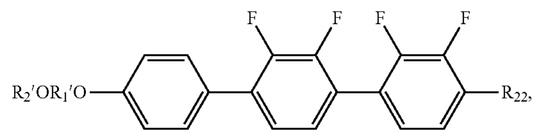

in which, $R_{12}$ and $R_{22}$ each independently represents $C_{1-10}$ linear alkyl or alkoxy, or $C_{2-10}$ alkenyl or alkenoxy, wherein one or more H of the alkyl or alkoxy and the alkenyl or alkenoxy can be substituted by F;

$R_1$' represents $C_{3-10}$ alkylene or $C_{3-10}$ alkenylene, $R_2$' represents linear $C_{1-10}$ alkyl or $C_{2-10}$ alkenyl.

5. The liquid crystal composition according to claim 1, wherein the compound of general formula II is selected from a group consisting of the following compounds:

II-1

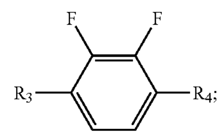

II-2

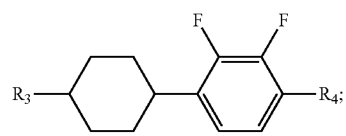

II-3

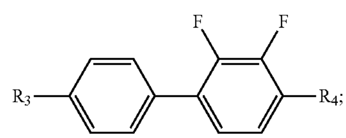

II-4

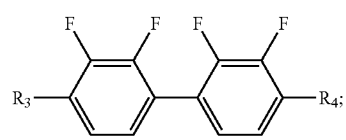

II-7

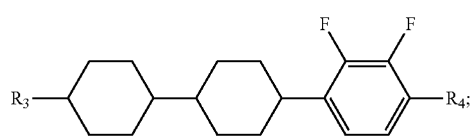

II-10

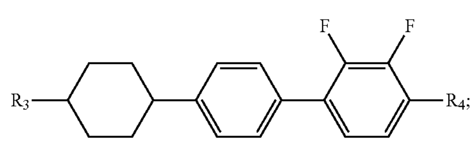

II-11

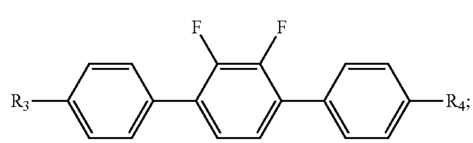

II-12

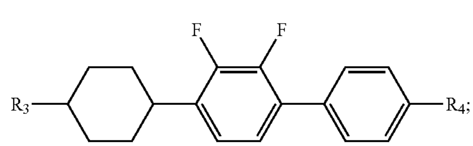

-continued

II-13

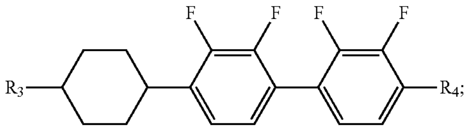

and

II-16

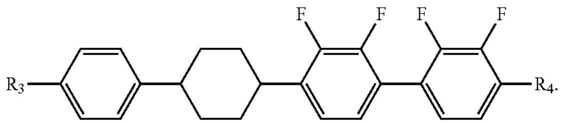

6. The liquid crystal composition according to claim 5, wherein the compound of general formula II comprises at least one liquid crystal compound having an end group of $—OR_3'OR_4'$.

7. The liquid crystal composition according to claim 1, wherein the compound of general formula III is selected from a group consisting of the following compounds:

III-1

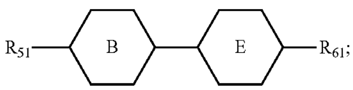

III-2

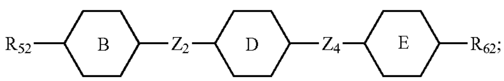

and

III-3

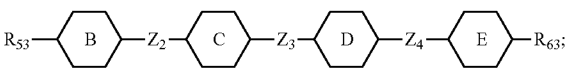

in which, $R_{51}$, $R_{52}$, $R_{53}$, $R_{61}$, $R_{62}$ and $R_{63}$ each independently represents —H, —F, $C_{1-12}$ alkyl or alkoxy, $C_{2-12}$ alkenyl or alkenoxy,

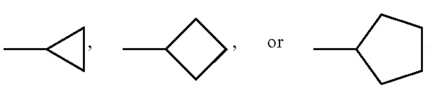

wherein one or more H of the alkyl or alkoxy and the alkenyl or alkenoxy can be substituted by F;

$Z_2$, $Z_3$ and $Z_4$ each independently represents single bond, —COO—, —OCO—, $—CH_2O—$, $—OCH_2—$ or $—CH_2CH_2—$;

ring

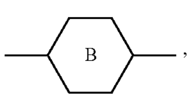

ring

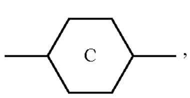

ring

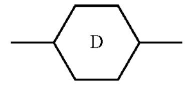

and ring

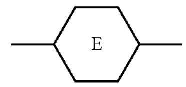

each independently represents

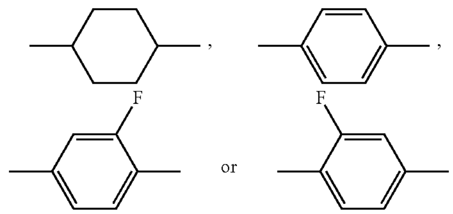

8. The liquid crystal composition according to claim 7, wherein the compound of general formula III-1 is selected from a group consisting of the following compounds:

III-1-1

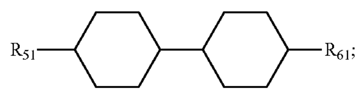

III-1-2

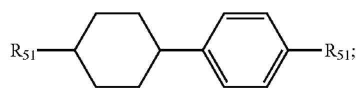

III-1-3

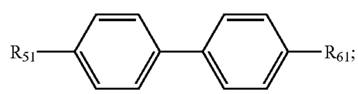

and

III-1-4

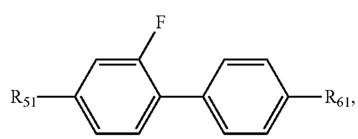

in which, $R_{51}$ and $R_{61}$ each independently represents H, $C_{1-7}$ alkyl or alkoxy, or $C_{2-7}$ alkenyl or alkenoxy.

9. The liquid crystal composition according to claim 7, wherein the compound of general formula III-2 is selected from a group consisting of the following compounds:

III-2-1

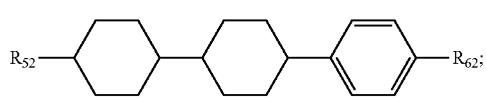

-continued

III-2-2

III-2-3

III-2-4

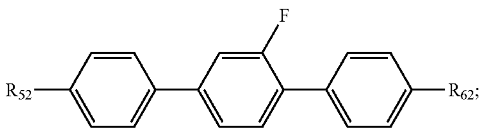

and

III-2-5

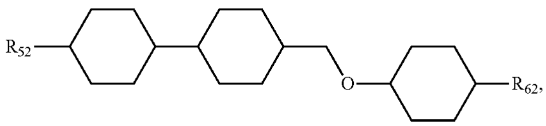

in which, $R_{52}$ and $R_{62}$ each independently represents H, $C_{1-7}$ alkyl or alkoxy, or $C_{2-7}$ alkenyl or alkenoxy.

10. The liquid crystal composition according to claim 7, wherein the compound of general formula III-3 is selected from a group consisting of the following compounds:

III-3-1

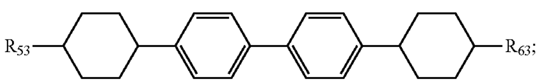

III-3-2

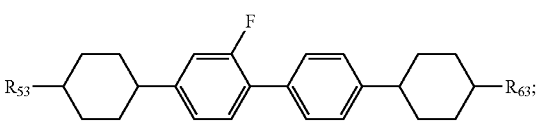

III-3-3

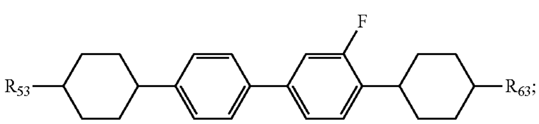

III-3-4

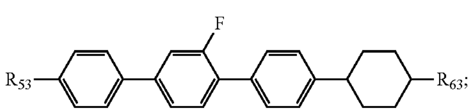

and

III-3-5

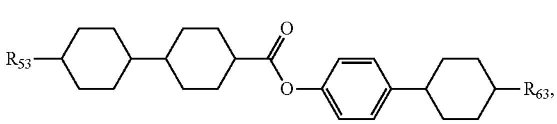

in which, $R_{53}$ and $R_{63}$ each independently represents H, $C_{1-7}$ alkyl or alkoxy, or $C_{2-7}$ alkenyl or alkenoxy.

11. A liquid crystal display device comprising the liquid crystal composition of claim 1.

12. The liquid crystal composition according to claim 1, further comprising one or more compounds selected from the group consisting of:

II-5

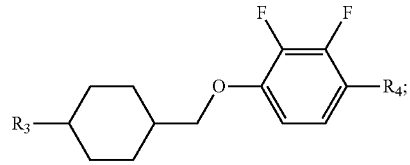

II-6

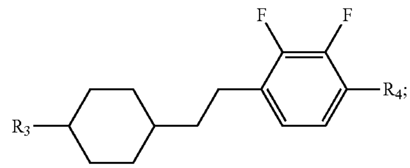

II-8

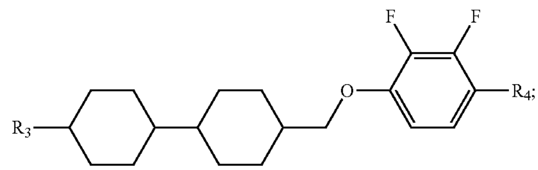

II-9

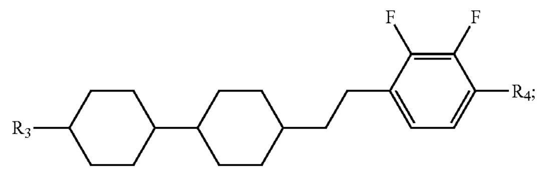

II-14

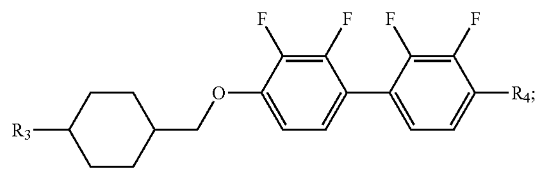

and

II-15

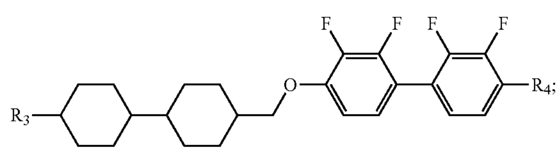

wherein $R_3$ and $R_4$ each independently represents —H, —F, $C_{1-12}$ linear alkyl or alkoxy, $C_{3-6}$ cycloalkyl, $C_{2-12}$ alkenyl or alkenoxy, or —$OR_3'OR_4'$, wherein one or more H of the alkyl or alkoxy and the alkenyl or alkenoxy can be substituted by F, wherein $R_3'$ represents $C_{3-12}$ alkylene or $C_{3-12}$ alkenylene, $R_4'$ represents linear $C_{1-12}$ alkyl or $C_{2-12}$ alkenyl.

13. The liquid crystal composition according to claim 12, wherein at least one $R_3$ or $R_4$ represents —$OR_3'OR_4'$.

* * * * *